(12) United States Patent
Fukawatase et al.

(10) Patent No.: US 8,408,589 B2
(45) Date of Patent: Apr. 2, 2013

(54) KNEE AIRBAG DEVICE FOR VEHICLE

(75) Inventors: Osamu Fukawatase, Aichi (JP); Hitoshi Matsushima, Aichi (JP); Kazuhiro Kawachi, Aichi (JP); Yasushi Itou, Toyota (JP); Tomoko Kurata, Toyota (JP)

(73) Assignee: Toyota Jidosha Kabushika Kaisha, Toyota-shi, Aichi-ken (JP)

( * ) Notice: Subject to any disclaimer, the term of this patent is extended or adjusted under 35 U.S.C. 154(b) by 22 days.

(21) Appl. No.: 13/061,546

(22) PCT Filed: Sep. 1, 2009

(86) PCT No.: PCT/JP2009/065274
§ 371 (c)(1),
(2), (4) Date: May 11, 2011

(87) PCT Pub. No.: WO2010/026970
PCT Pub. Date: Mar. 11, 2010

(65) Prior Publication Data
US 2011/0272929 A1    Nov. 10, 2011

(30) Foreign Application Priority Data

Sep. 4, 2008 (JP) ................................. 2008-227571

(51) Int. Cl.
*B60R 21/206* (2011.01)
*B60R 21/215* (2011.01)
(52) U.S. Cl. .................... 280/728.3; 280/730.1; 280/752
(58) Field of Classification Search ............... 280/728.3, 280/730.1, 732, 752, 753
See application file for complete search history.

(56) References Cited

U.S. PATENT DOCUMENTS

| 5,013,064 | A  | * | 5/1991  | Miller et al. | ............... | 280/730.1 |
| 6,155,595 | A  |   | 12/2000 | Schultz |  |  |
| 6,505,850 | B2 | * | 1/2003  | Helfrich et al. | ............ | 280/728.3 |
| 6,705,638 | B2 |   | 3/2004  | Abe et al. |  |  |

(Continued)

FOREIGN PATENT DOCUMENTS

| JP | 11-321539 | 11/1999 |
| JP | 2001-106010 | 4/2001 |

(Continued)

OTHER PUBLICATIONS

Extended European Search Report for EP Appl. No. 09811496.0 dated Dec. 23, 2011.

(Continued)

*Primary Examiner* — Joseph Rocca
(74) *Attorney, Agent, or Firm* — Finnegan, Henderson, Farabow, Garrett & Dunner, LLP

(57) ABSTRACT

A knee airbag device for a vehicle, configured in such a manner that, when a knee airbag is inflated and expanded with the knees of a vehicle occupant located close to an airbag door, a load to the lower legs is reduced. A first tear section (100) for expanding a first airbag door (108) in the vehicle's top-bottom direction and a second tear section (102) for expanding a second airbag door (112) in the vehicle's lateral direction are formed on the rear surface side of a glove-box-door outer member (24). The first tear section (100) is composed of a left and right pair of vertical tear sections (104) and a first horizontal tear section (106). The second tear section (102) is composed of second lateral tear sections (110).

7 Claims, 18 Drawing Sheets

U.S. PATENT DOCUMENTS

| | | | |
|---|---|---|---|
| 7,175,195 B2 * | 2/2007 | Morita | 280/730.1 |
| 7,261,318 B2 | 8/2007 | Enders | |
| 7,905,512 B2 * | 3/2011 | Park | 280/728.3 |
| 8,100,431 B2 * | 1/2012 | Totani et al. | 280/728.3 |
| 8,215,667 B2 * | 7/2012 | Matsushima | 280/730.1 |
| 2004/0160043 A1 * | 8/2004 | Litjens et al. | 280/732 |
| 2005/0046158 A1 | 3/2005 | Abe | |
| 2006/0022440 A1 | 2/2006 | Umehara | |
| 2006/0103121 A1 | 5/2006 | Seung-Jae et al. | |
| 2008/0122204 A1 * | 5/2008 | Fukawatase et al. | 280/728.3 |
| 2009/0115172 A1 | 5/2009 | Fukawatase et al. | |

FOREIGN PATENT DOCUMENTS

| | | |
|---|---|---|
| JP | 2001-180417 | 7/2001 |
| JP | 2002-29355 | 1/2002 |
| JP | 2002-356137 | 12/2002 |
| JP | 2005-67466 | 3/2005 |
| JP | 2006-36141 | 2/2006 |
| JP | 2007-15440 | 1/2007 |
| JP | 2007-55413 | 3/2007 |
| JP | 2007-153222 | 6/2007 |
| JP | 2007-161090 | 6/2007 |
| JP | 2007-302063 | 11/2007 |
| JP | 2008-174210 | 7/2008 |
| WO | WO 2008/047605 | 4/2008 |

OTHER PUBLICATIONS

International Search Report in International Application No. PCT/JP2009/065274; Mailing Date: Oct. 27, 2009.

Translation of Notice of Reasons for Rejection in JP 2008-227571; Mailing Date: Oct. 20, 2009.

Applicant's Response to Written Opinion in International Application No. PCT/JP2009/065274 (response to Written Opinion dated Oct. 27, 2009).

* cited by examiner

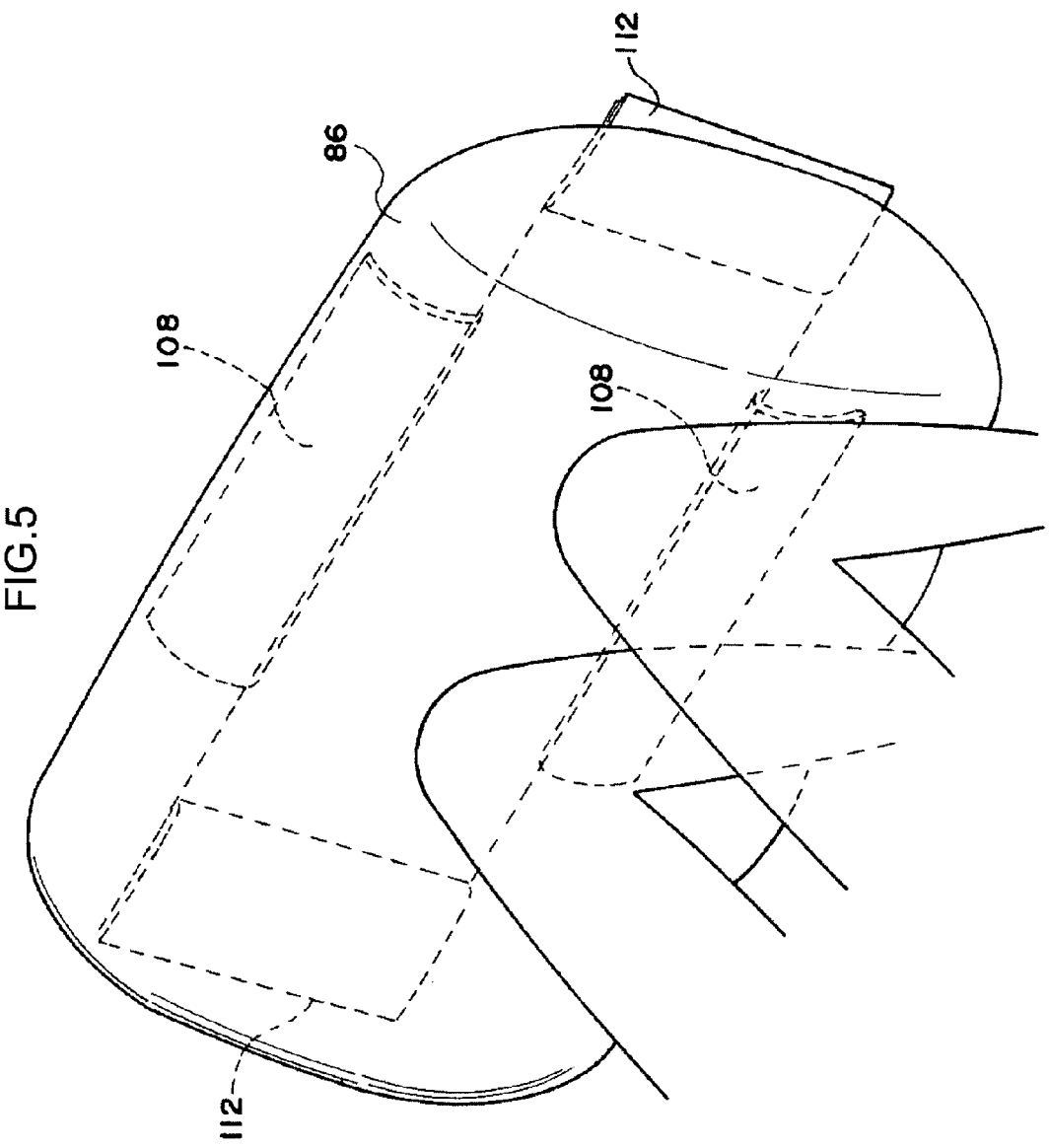

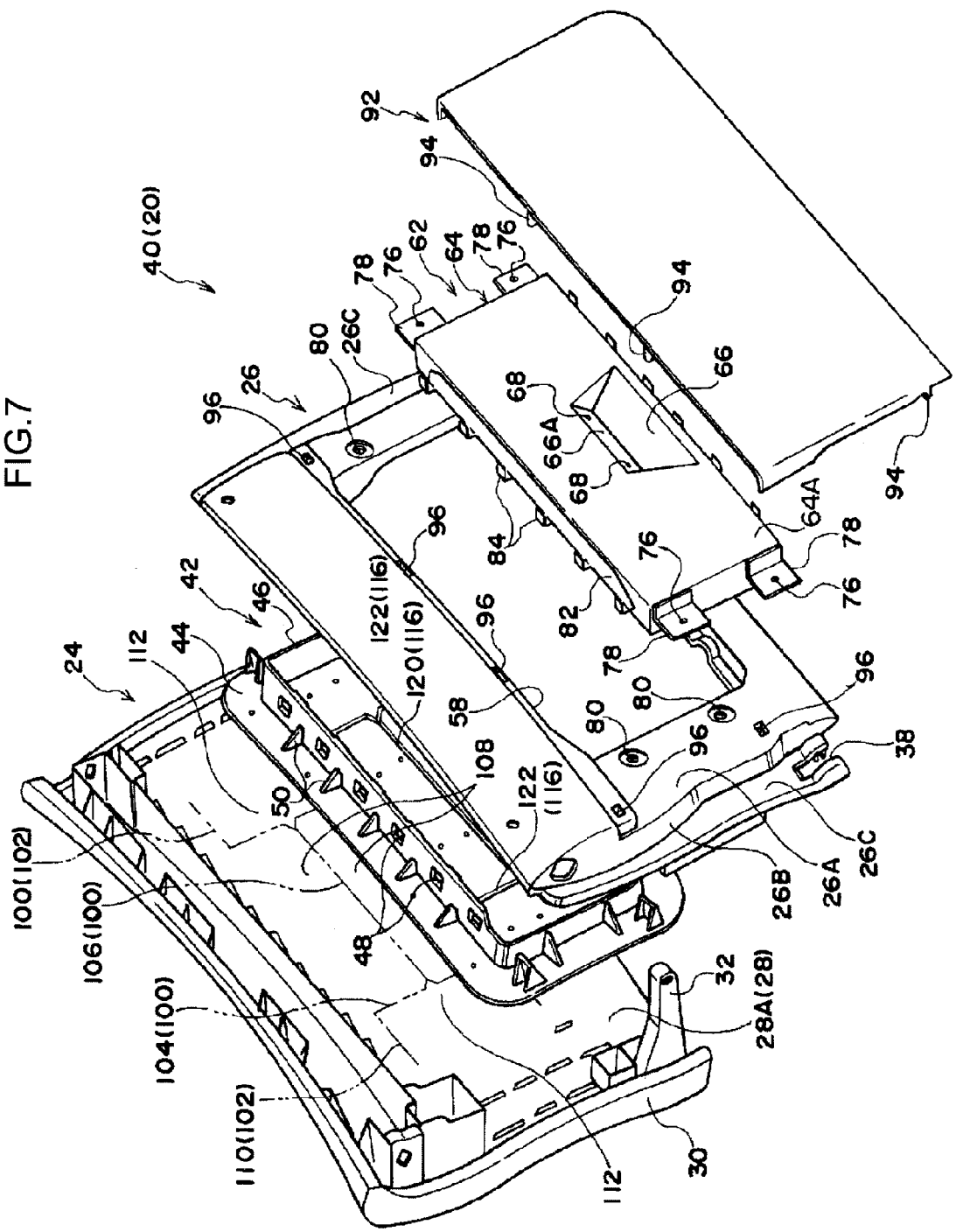

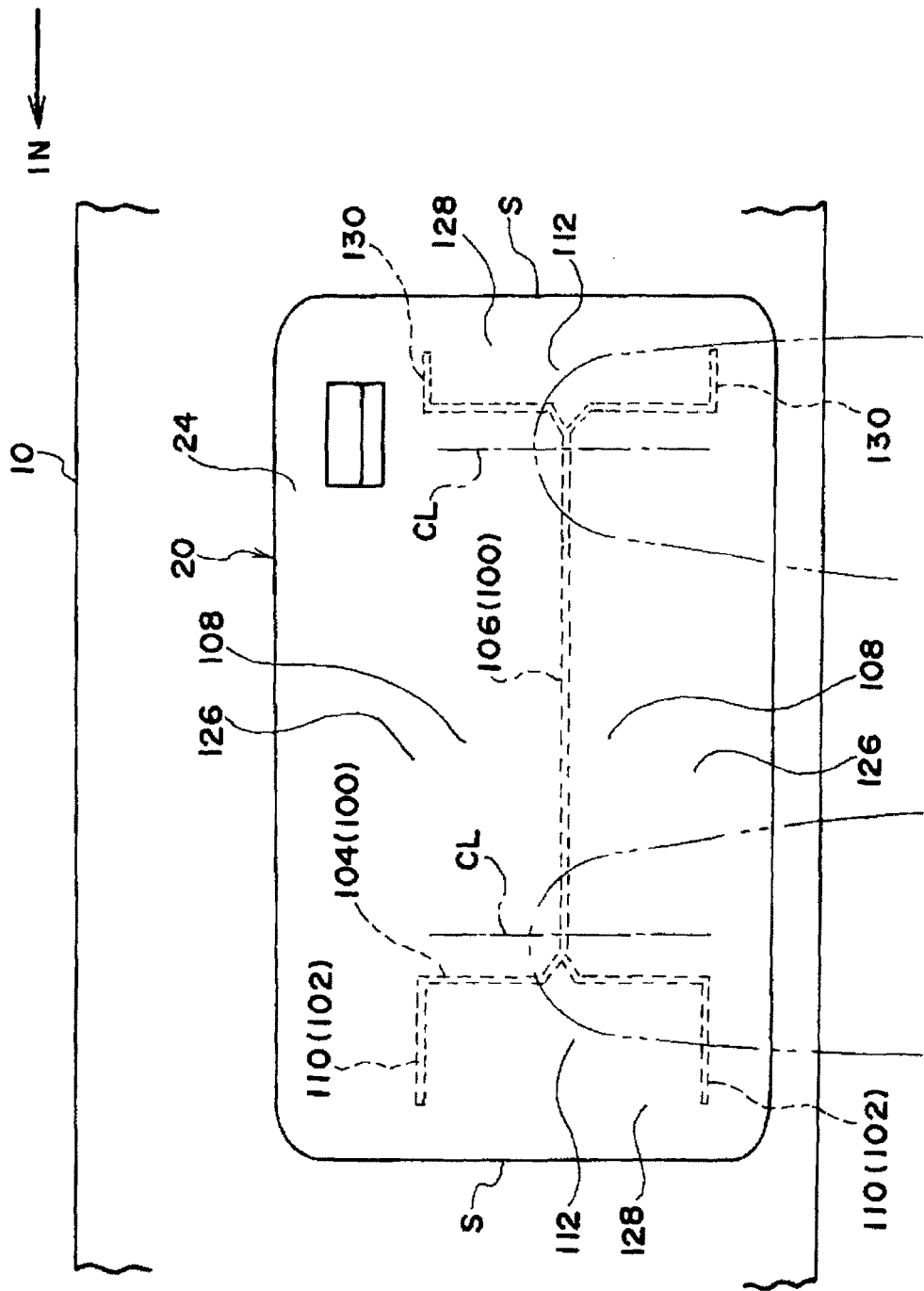

KNEE AIRBAG DEVICE FOR VEHICLE

CROSS-REFERENCE TO RELATED APPLICATIONS

This application is a national phase application of International Application No. PCT/JP2009/065274, filed Sep. 1, 2009, and claims the priority of Japanese Application No. 2008-227571, filed Sep. 4, 2008, the contents of both of which are incorporated herein by reference.

TECHNICAL FIELD

The present invention relates to a knee airbag device for a vehicle that protects the knees of a vehicle occupant.

BACKGROUND TECHNOLOGY

In recent years, the installation into vehicles of knee airbag devices for vehicles, that inflate and expand a knee airbag at the time of a collision and restrain the kneecaps (hereinafter simply called "knees") of a vehicle occupant, is being accelerated from the standpoint of improving the vehicle occupant protecting performance at the time of a collision.

For example, in the knee airbag device for a vehicle for the front passenger's seat that is disclosed in following Patent Document 1 (Japanese Patent Application Laid-Open No. 11-321539), an airbag module is disposed at the knee height of a seated vehicle occupant at an instrument panel, and, at the time of a collision, a knee airbag that is divided into an upper chamber, a central chamber, and a lower chamber is inflated and expanded toward the knees of the vehicle occupant.

Further, in the knee airbag device for a vehicle for the front passenger's seat that is disclosed in following Patent Document 2 (Japanese Patent Application Laid-Open No. 2002-356137), an airbag module is disposed within the glove box door of a glove box. At the time of a collision, gas is jetted-out from an inflator disposed within the glove box door, and a knee airbag, that is accommodated within the glove box door in a folded-up state, is inflated and expanded toward the knees of the vehicle occupant.

Patent Document 1: Japanese Patent Application Laid-Open No. 11-321539
Patent Document 2: Japanese Patent Application Laid-Open No. 2002-356137
Patent Document 3: Japanese Patent Application Laid-Open No. 2006-36141
Patent Document 4: Japanese Patent Application Laid-Open No. 2007-161090

DISCLOSURE OF THE INVENTION

Problems to be Solved by the Invention

However, in the cases of the above-described prior art, there is room for improvement in the following points. Namely, in the case of the knee airbag device for a vehicle disclosed in Patent Document 1 (Japanese Patent Application Laid-Open No. 11-321539), the module case of the airbag module is supported at the vehicle body side, and the knee airbag inflates and expands at a height in the vicinity (hereinafter simply called "shin upper portions") of the upper portions of the shins of the vehicle occupant (directly beneath the kneecaps). Therefore, when a vehicle occupant sits down on a seat for a vehicle in a state in which his/her knees are close to or in a state in which they are contacting the knee airbag doors (hereinafter, both are collectively called "a state of being close or the like"), there are cases in which the shin upper portions are pushed toward the vehicle rear side by the expansion reaction force of the knee airbag, and load is applied to the shins. Note that, also in the case of the knee airbag device for a vehicle disclosed in Patent Document 2 (Japanese Patent Application Laid-Open No. 2002-356137), the glove box door that houses the airbag module is supported at the vehicle body side via the glove box main body, and the knee airbag inflates and expands at the height of the upper shin portions of the vehicle occupant, and therefore, there is a similar problem.

In view of the above-described circumstances, an object of the present invention is to obtain a knee airbag device for a vehicle that can reduce the load to the shins when a knee airbag inflates and expands in a state in which the knees of the vehicle occupant are close or the like to airbag doors.

Means for Solving the Problems

A first aspect of the present invention has: gas generating means for generating gas by operating; a knee airbag that is housed in a folded-up state, and that is disposed at a height of knees of a vehicle occupant who is in a seated state, and that inflates and expands toward the knees of the vehicle occupant due to gas supplied from the gas generating means; and an airbag cover that covers the knee airbag in the folded-up state, and that is provided with a first tear portion that, when bag inflation pressure of a predetermined value or greater is applied, fractures, and expands first airbag doors in a vehicle vertical direction, and second tear portions that are formed continuously with the first tear portion and that, even when an obstruction exists on a locus of movement at an initial stage of expansion of the first airbag doors, expand second airbag doors in a vehicle transverse direction.

A second aspect of the present invention has the feature that, in the first aspect, the first tear portion is formed in a substantial H-shape that includes a pair of left and right vertical direction tear portions, and a first lateral direction tear portion that connects these vertical direction tear portions in the vehicle transverse direction, and the second tear portion is structured so as to include second lateral direction tear portions that extend from both end portions of the respective vertical direction tear portions toward sides opposite the first lateral direction tear portion.

A third aspect of the present invention has the feature that, in the second aspect, the first tear portion further includes third lateral direction tear portions that extend from the both end portions of the respective vertical direction tear portions toward sides opposite the second lateral direction tear portions.

A fourth aspect of the present invention has the feature that, in the third aspect, when a distance between the first lateral direction tear portion and the second lateral direction tear portion is A, and a length of the second lateral direction tear portion is B, and a length of the third lateral direction tear portion is C, they are set to A≈B≈C.

A fifth aspect of the present invention has the feature that, in the fourth aspect, a surface area of portions other than regions that are formed at vehicle transverse direction outer sides of door hinges that are formed adjacent to the third lateral direction tear portions and on extended lines thereof at the first airbag doors, and a surface area of the second airbag doors, are set to be substantially the same.

A sixth aspect of the present invention has the feature that, in any one aspect of the third aspect through the fifth aspect, at least portions of regions, that are formed at vehicle transverse direction outer sides of door hinges that are formed adjacent to the third lateral direction tear portions and on extended lines thereof at the first airbag doors, are weakened as compared with other regions.

A seventh aspect of the present invention has the feature that, in the sixth aspect, weakened portions are provided at least one of corner portions at intersection point sides of the third lateral direction tear portions and the vertical direction tear portions, and corner portions at intersection point sides of the first lateral direction tear portion and the vertical direction tear portions, at the regions that are formed at the vehicle transverse direction outer sides of the door hinges.

An eighth aspect of the present invention has the feature that, in any one aspect of the third aspect through the seventh aspect, a hinge length, at third lateral direction tear portion sides, of door hinges that are formed adjacent to the third lateral direction tear portions and on extended lines thereof at the first airbag doors, is set to be longer than a hinge length at a door hinge central side.

A ninth aspect of the present invention has the feature that, in any one aspect of the second aspect through the eighth aspect, the vertical direction tear portions are set at vehicle transverse direction outer sides of knee central lines of a seated vehicle occupant and at vehicle transverse direction inner sides of vertical direction outer shape lines of the airbag cover.

A tenth aspect of the present invention has the feature that, in any one aspect of the second aspect through the ninth aspect, connected portions of the vertical direction tear portions and the first lateral direction tear portion are formed in sideways Y-shapes.

An eleventh aspect of the present invention has the feature that, in any one aspect of the second aspect through the ninth aspect, arc-shaped tear portions are formed instead of the vertical direction tear portions and the second lateral direction tear portions.

A twelfth aspect of the present invention has the feature that, in any one aspect of the second aspect through the ninth aspect, V-shaped tear portions are formed instead of the vertical direction tear portions and the second lateral direction tear portions.

A thirteenth aspect of the present invention has the feature that, in any one aspect of the sixth aspect through the twelfth aspect, regions are weakened by forming numerous grooves, whose groove longitudinal direction is the vehicle transverse direction, at a predetermined pitch at a reverse surface side of regions formed at outer sides of the door hinges.

A fourteenth aspect of the present invention has the feature that, in any one aspect of the first aspect through the thirteenth aspect, it is housed in a glove box door that is provided at a front passenger's seat side of an instrument panel.

A fifteenth aspect of the present invention has the feature that, in the tenth aspect, a planar shape of a design surface side of the instrument panel forms a curved shape that extends toward a vehicle rear side from a vehicle transverse direction outer side to a vehicle transverse direction central side, the second tear portions are set at both a vehicle transverse direction outer side of the first tear portion and an instrument panel central side, and the second tear portion at the instrument panel central side is set to be longer than the second tear portion at the vehicle transverse direction outer side.

In accordance with the first aspect of the present invention, when the gas generating means operates, gas is generated, and the gas flows-into the knee airbag that is housed in a folded-up state. Due thereto, the knee airbag inflates, the first tear portion and the second tear portions provided at the airbag cover fracture (rupture), and the first airbag doors are expanded in the vehicle vertical direction, and the second airbag doors are expanded in the vehicle transverse direction. Due thereto, the knee airbag is inflated and expanded toward the knees of the vehicle occupant.

Here, in the present invention, because the knee airbag is disposed at the height of the knees of the vehicle occupant who is in a seated state, if the vehicle occupant is seated on the seat for a vehicle in a state in which his/her knees are close or the like to the disposed regions of the first airbag doors at the airbag cover, there are cases in which the upper shin portions are strongly pushed toward the vehicle rear side due to the expansion reaction force of the knee airbag at the time when the knee airbag inflates and expands.

However, in the present invention, because the second tear portions are provided in addition to the first tear portion at the airbag cover, when the knees of the vehicle occupant who is in a seated state exist as an obstruction on the locus of movement in the initial stage of expansion of the first airbag doors, the second tear portions fracture and the second airbag doors start to expand in the vehicle transverse direction. Due thereto, the knee airbag expands first in the vehicle transverse direction, and the expansion reaction force of the knee airbag that is applied to the upper shin portions of the vehicle occupant is suppressed by that much.

In accordance with the second aspect of the present invention, the first tear portion is formed in a substantial H-shape that includes the pair of left and right vertical direction tear portions, and the first lateral direction tear portion that connects these vertical direction tear portions in the vehicle transverse direction, and the second tear portion is structured so as to include the second lateral direction tear portions that extend from both end portions of the vertical direction tear portions of the first tear portion toward sides opposite the first lateral direction tear portion. Therefore, the second airbag doors can be expanded greatly in the vehicle transverse direction.

Further, by changing the length of the second lateral direction tear portions, the size of the second airbag doors that expand in the vehicle transverse direction can be changed easily.

In accordance with the third aspect of the present invention, if only the second lateral direction tear portions are formed and the third lateral direction tear portions are not formed, the portions that are the intersection points of the vertical direction tear portions and the second lateral direction tear portions do not stretch, and there are cases in which it is difficult to fracture (rupture) the second lateral direction tear portions.

However, in the present invention, because the third lateral direction tear portions extend from both end portions of the respective vertical direction tear portions toward sides opposite the second lateral direction tear portions, the portions that are the intersection points can stretch.

In accordance with the fourth aspect of the present invention, when the distance between the first lateral direction tear portion and the second lateral direction tear portion is A, and the length of the second lateral direction tear portion is B, and the length of the third lateral direction tear portion is C, they are set to A≈B≈C. Therefore, the respective tear portions proceed to fracture (rupture) in a balanced manner.

In accordance with the fifth aspect of the present invention, the surface area of portions other than regions that are formed at the outer sides of door hinges that are formed adjacent to the third lateral direction tear portions and on extended lines thereof at the first airbag doors, and a surface area of the second airbag doors, are set to be substantially the same. Therefore, the bag inflation pressures that the first airbag doors and the second airbag doors receive substantially coincide. Thus, the first airbag doors and the second airbag doors proceed to expand substantially uniformly.

In accordance with the sixth aspect of the present invention, by adding the third lateral direction tear portions, at the time of expansion of the first airbag doors, the end portions in the vehicle transverse direction of the first airbag doors roll upward. It is thought that, due to this rolling-up, the expansion operation in the vehicle vertical direction of the first airbag doors is impeded.

However, in the present invention, at least portions of regions, that are formed at the outer sides of door hinges that are formed adjacent to the third lateral direction tear portions and on extended lines thereof at the first airbag doors, are weakened as compared with other regions. Therefore, even if these regions at the first airbag doors interfere with the airbag cover or the like, they deform easily. Accordingly, they do not impede the expansion operation of the first airbag doors.

In accordance with a seventh aspect of the present invention, the following operation is obtained because weakened portions are provided at least one of corner portions at intersection point sides of the third lateral direction tear portions and the vertical direction tear portions, and corner portions at intersection point sides of the first lateral direction tear portion and the vertical direction tear portions, at the regions that are formed at the outer sides of the door hinges.

Namely, when weakened portions are provided at the corner portions at the intersection point sides of the third lateral direction tear portions and the vertical direction tear portions, interference with the airbag cover is mitigated, and therefore, good expandability of the first airbag doors can be ensured. On the other hand, when weakened portions are provided at the corner portions at the intersection point sides of the first lateral direction tear portion and the vertical direction tear portions, interference with the knee airbag is mitigated, and therefore, the load that is transmitted from these corner portions via the knee airbag to the knees of the vehicle occupant becomes low.

In accordance with the eighth aspect of the present invention, the hinge length, at third lateral direction tear portion sides, of door hinges that are formed adjacent to the third lateral direction tear portions and on extended lines thereof at the first airbag doors, is set to be longer than the hinge length at a door hinge central side. Therefore, the third lateral direction tear portion sides, at which the hinge length is relatively long, can be expanded smoothly by that much.

In accordance with the ninth aspect of the present invention, the vertical direction tear portions are set at vehicle transverse direction outer sides of knee central lines of a seated vehicle occupant and at vehicle transverse direction inner sides of vertical direction outer shape lines of the airbag cover. Therefore, the second airbag doors can be expanded relatively greatly in the vehicle transverse direction.

In accordance with the fourteenth aspect of the present invention, because the knee airbag is housed in the glove box door, the knee airbag is inflated and expanded from the glove box door. Therefore, there is no need to ensure, within the instrument panel, a space exclusively used for accommodating the knee airbag in the folded-up state.

In accordance with the fifteenth aspect of the present invention, when the planar shape of the design surface side of the instrument panel forms a curved shape that extends toward a vehicle rear side, approaching a vehicle transverse direction central side from a vehicle transverse direction outer side, the gap between the knees of the vehicle occupant and the instrument panel is more narrow at the instrument panel central side. In the present invention, because the second tear portion at the instrument panel central side is set to be longer than the second tear portion at the vehicle transverse direction outer side, even if the gap is narrow, the second airbag doors can be expanded greatly.

Effects of the Invention

As described above, the knee airbag device for a vehicle relating to the first aspect of the present invention has the excellent effect that, when the knee airbag inflates and expands in a state in which the knees of the vehicle occupant are close or the like to the airbag doors, the load on the shins can be reduced.

The knee airbag device for a vehicle relating to the second aspect of the present invention has the excellent effects that the expansion reaction force of the knee airbag that is applied to the shin upper portions of the vehicle occupant can be effectively suppressed, and the size of the second airbag doors that expand in the vehicle transverse direction can be adjusted easily.

The knee airbag device for a vehicle relating to the third aspect of the present invention has the excellent effect that the expandability of the second airbag doors that expand in the vehicle transverse direction can be improved.

The knee airbag device for a vehicle relating to the fourth aspect of the present invention has the excellent effect that the expandability of the first airbag doors that expand in the vehicle vertical direction and the expandability of the second airbag doors that expand in the vehicle transverse direction can be further improved.

The knee airbag device for a vehicle relating to the fifth aspect of the present invention has the excellent effect that the first airbag doors and the second airbag doors can be expanded rapidly and smoothly.

The knee airbag device for a vehicle relating to the sixth aspect of the present invention has the excellent effect that the first airbag doors can be expanded reliably in the vehicle vertical direction.

The knee airbag device for a vehicle relating to the seventh aspect of the present invention has the excellent effects that further improvement in the expandability of the first airbag doors can be aimed for, and the load, that is transmitted from the first airbag doors via the knee airbag toward the knees of the vehicle occupant, can be suppressed.

The knee airbag device for a vehicle relating to the eighth aspect of the present invention has the excellent effect that the expandability of the first airbag doors can be improved.

The knee airbag device for a vehicle relating to the ninth aspect of the present invention has the excellent effect that, from the standpoint of restrictions on the design of the airbag cover, even if the interval between the knee central line of the seated vehicle occupant and the vertical direction outer shape line of the airbag cover is narrow, the second airbag doors are expanded, and the load on the shins of the vehicle occupant can be reduced.

The knee airbag device for a vehicle relating to the fourteenth aspect of the present invention has the excellent effect that the conventional degrees of freedom in design of the glove box door, and accordingly the instrument panel, can be ensured.

The knee airbag device for a vehicle relating to the fifteenth aspect of the present invention has the excellent effect that, even when the planar shape of the design surface side of the instrument panel forms a curved shape that extends toward the vehicle rear side from the vehicle transverse direction outer side toward the vehicle transverse direction central side, the second airbag doors can be expanded greatly, and accordingly, the load on the shins of the vehicle occupant can be reduced.

BRIEF DESCRIPTION OF THE DRAWINGS

FIG. 5 is a similar perspective view showing a process (completion of expansion) in which the glove box door built-in-type knee airbag device shown in FIG. 1 operates and the knee airbag inflates and expands.

FIG. 7 is an exploded perspective view of the glove box door.

FIG. 11 is a schematic enlarged front view that relates to the glove box door built-in-type knee airbag device relating to the second embodiment, and that illustrates the shapes of tear portions of a glove box door in relation to the knees of a seated vehicle occupant.

PREFERRED FORMS FOR IMPLEMENTING THE INVENTION

First Embodiment

Hereinafter, a first embodiment of a knee airbag device for a vehicle relating to the present invention is described by using FIG. 1 through FIG. 9. Note that arrow FR shown appropriately in these drawings indicates the vehicle front side, arrow UP indicates the vehicle upper side, and arrow IN indicates the vehicle transverse direction inner side.

Figure 6A:
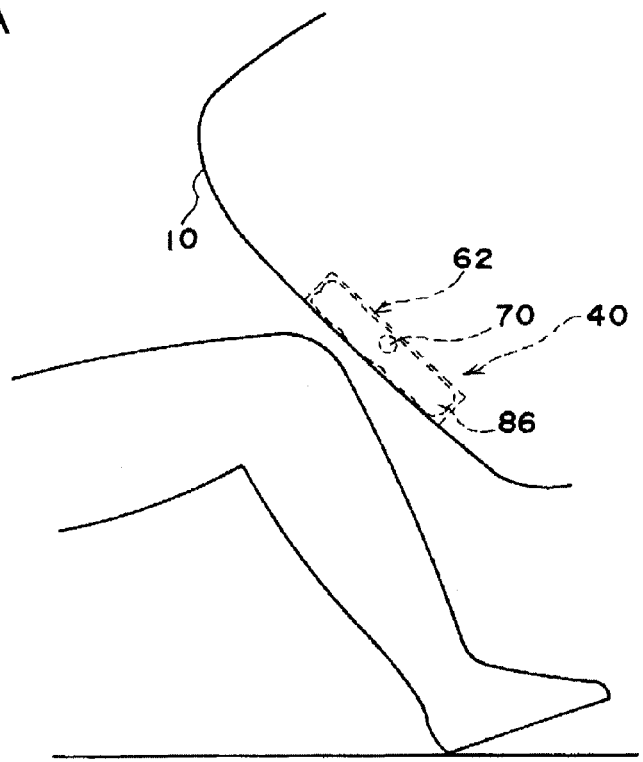
FIG. 6A is a schematic longitudinal sectional view showing the positional relationship between the glove box door in a non-operated state and the seated vehicle occupant, as seen from a side of the vehicle.
Figure 6B:
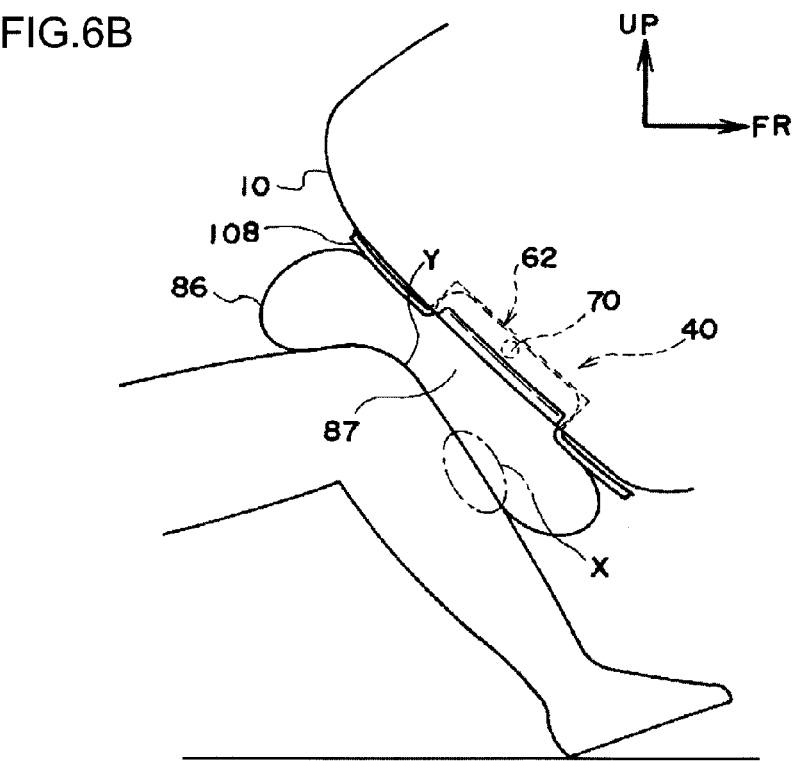
FIG. 6B is a schematic longitudinal sectional view showing the positional relationship between the glove box door in an operated state (initial stage of expansion) and the seated vehicle occupant, as seen from a side of the vehicle.
Figure 8:
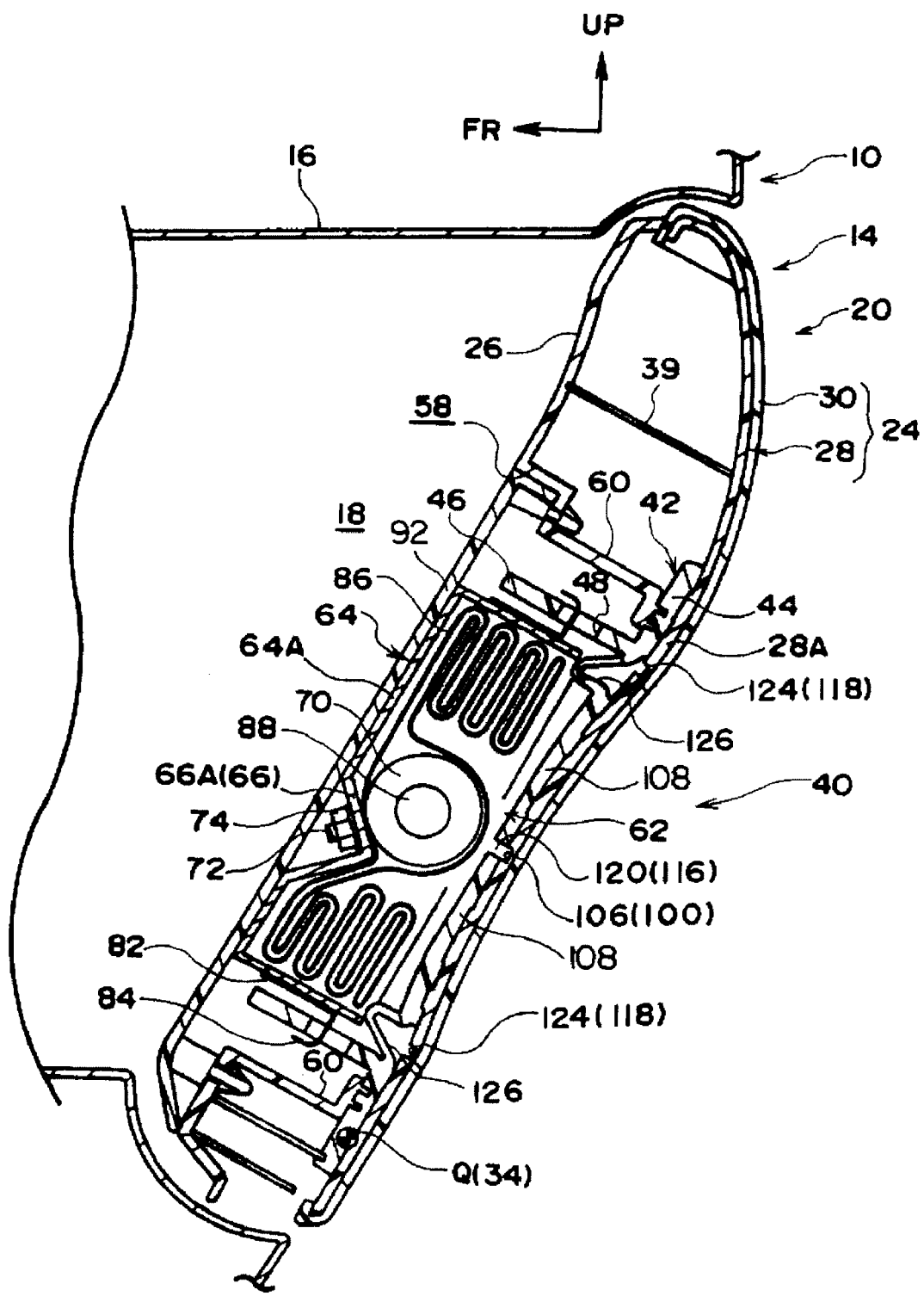
FIG. 8 is an enlarged longitudinal sectional view of main portions (an enlarged sectional view along line 1-1 of FIG. 5) of the glove box door built-in-type knee airbag device relating to the first embodiment.
Figure 9:
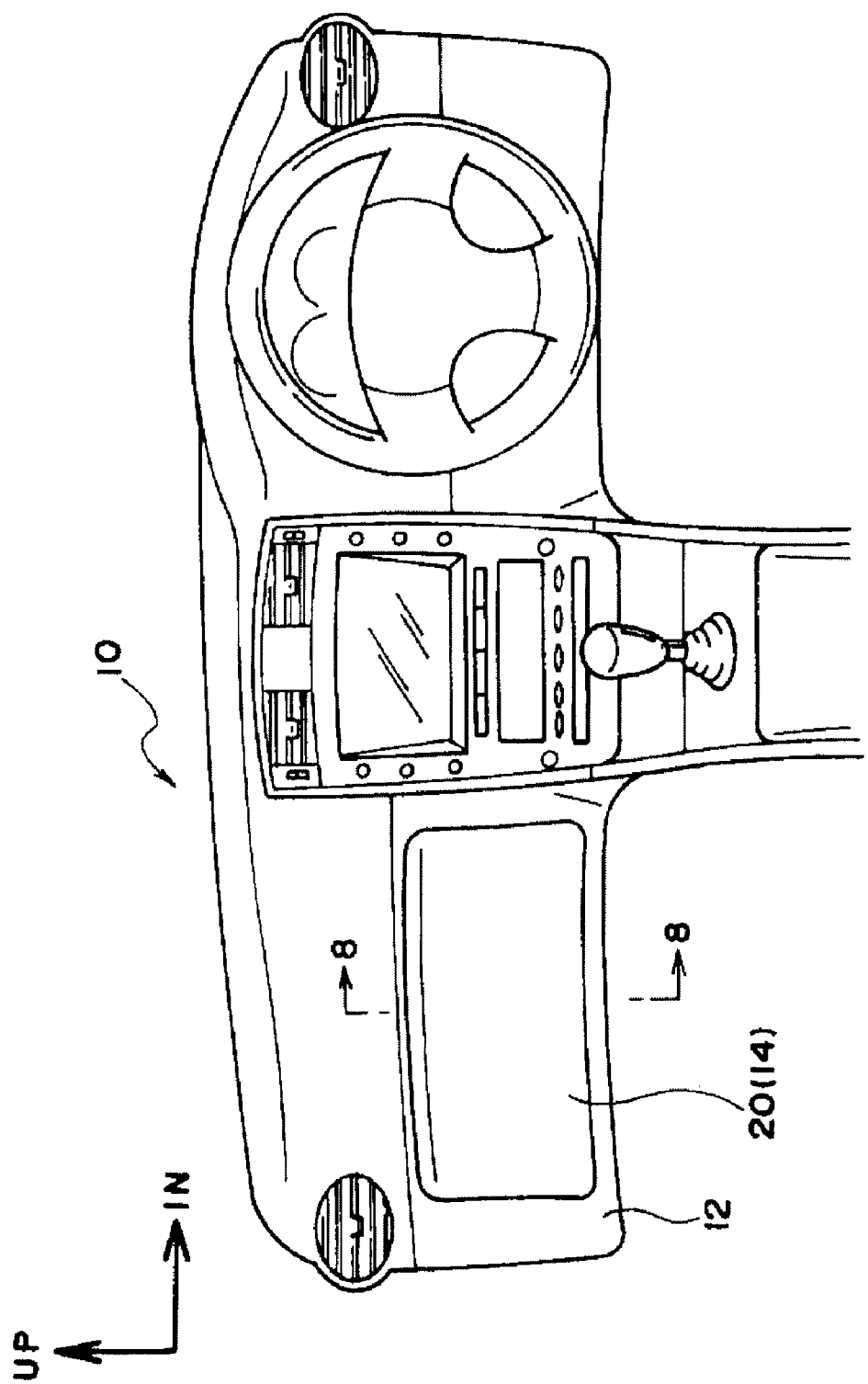
FIG. 9 is an external front view of an instrument panel in which the glove box door built-in-type knee airbag device relating to the first embodiment is installed.

An external front view of an instrument panel in which the glove box door built-in-type knee airbag device relating to the present embodiment is installed is shown in FIG. 9. Further, an enlarged longitudinal sectional view of main portions (an enlarged sectional view along line 8-8 of FIG. 9) of the glove box door built-in-type knee airbag device at a time of non-operation is shown in FIG. 8. Moreover, an exploded perspective view of a glove box door is shown in FIG. 7. Further, schematic longitudinal sectional views showing the positional relationship between the glove box door a seated vehicle occupant, as seen from a side of the vehicle, are shown in FIG. 6A, FIG. 6B. First, the structure of the device overall is described by using these drawings.

As shown in FIG. 9, a glove box 14 for placing small items is disposed at a position substantially opposing the knees of a vehicle occupant at the front passenger's seat side of an instrument panel 10 (more accurately, at the upper portion of an instrument panel lower 12 that structures the lower portion of the instrument panel 10). As shown in FIG. 8, the glove box 14 is structured by a glove box main body 16 that is made of resin and is formed in the shape of a box, and a glove box door 20 that serves as an airbag cover that opens and closes an opening portion 18 of the glove box main body 16. The glove box main body 16 is disposed such that the opening portion 18 faces the vehicle rear side (the vehicle cabin inner side).

As shown in FIG. 7 and FIG. 8, a glove box door built-in-type knee airbag device 40 is built in the glove box door 20 that closes the opening portion 18 of the above-described glove box main body 16. The glove box door 20 has a glove box door outer 24, that is disposed at the vehicle cabin inner side and forms the design surface and is rectangular panel shaped, and a glove box door inner 26, that is disposed at the vehicle front side of this glove box door outer 24 and is fit on the glove box door outer 24 and is rectangular frame shaped. The glove box door outer 24 and the glove box door inner 26 are both made of resin.

The glove box door outer 24 is structured as a two-layer structure of a base member 28 that is formed in a substantially rectangular panel shape, and a surface skin 30 that covers the vehicle cabin inner side surface of the base member 28. Both the base member 28 and the surface skin 30 are made of resin, but the surface skin 30 is structured of a resin material that is softer than the base member 28. A pair of left and right stoppers 32 stand erect at the both sides of the lower edge side of the base member 28. Each of the stoppers 32 extends from a general portion 28A of the base member 28 toward a surface orthogonal direction (the vehicle front side), and, when the glove box door 20 is in a fully open state, the distal end portions interfere with wall surfaces of the glove box main body 16, and the stoppers 32 perform the function of holding the glove box door 20 at the fully open position.

A hinge 34, that is formed in a substantial L-shape in side view, is provided at the inner side of the stopper 32. One end portion of the hinge 34 is fixed by a screw or the like to the glove box main body 16. When the glove box door 20 is opened and closed, the glove box door 20 rotates around rotation center Q in FIG. 8.

On the other hand, the glove box door inner 26 is structured to include a floor wall portion 26A that is rectangular frame shaped and faces the general portion 28A of the base member 28 of the glove box door outer 24, a pair of left and right side wall portions 26B that are formed integrally with the both side portions in the vehicle transverse direction of the floor wall portion 26A, and a pair of left and right overhang portions 26C that jut-out from the glove box door outer 24 side end portions of the pair of left and right side wall portions 26B toward the vehicle transverse direction outer sides. Cut-outs 38 are formed in the bottom edge sides of the overhang portions 26C at positions facing the stoppers 32 of the glove box door outer 24. The stoppers 32 are inserted within the cut-outs 38.

The glove box door outer 24 and the glove box door inner 26 of the above-described structure are joined together via vertical direction, lateral direction ribs 39 (see FIG. 8) that are formed at least one of the both. Concretely, the glove box door outer 24 and the glove box door inner 26 are vibration welded at the distal end portions of the ribs 39, but fastening by a fastener may be utilized, or vibration welding and fastening may be used in combination, and it suffices for there to be a structure that can make the glove box door outer 24 and the glove box door inner 26 integral.

As shown in FIG. 7 and FIG. 8, an airbag door retainer 42, that is made of resin and formed in a substantial rectangular flat plate shape, is disposed between the above-described glove box door outer 24 and glove box door inner 26. The airbag door retainer 42 has a base portion 44 that is rectangular flat plate shaped, and a longitudinal wall portion 46 that is rectangular frame shaped and stands erect from a vicinity of the outer peripheral portion of the base portion 44. Plural anchor holes 48, that are each structured as a rectangular opening, are formed at predetermined intervals in the upper portion and the lower portion of the longitudinal wall portion 46. Note that plural ribs 50 for reinforcement, that are disposed so as to span between the both and that are right-triangular in side view, stand erect between a region in the vicinity of the outer peripheral portion of the base portion 44 and the longitudinal wall portion 46.

As shown in FIG. 8, a pair of upper and lower ribs 60, that extend-out toward the airbag door retainer 42, are formed integrally at the top edge side and the bottom edge side of a central opening portion 58 that is in the floor wall portion 26A of the above-described glove box door inner 26. In the assembled state of the glove box door 20, these ribs 60 stand erect in parallel at the outer sides of the top wall portion and the bottom wall portion of the longitudinal wall portion 46 of the airbag door retainer 42, and the respective distal end portions are welded (vibration welded) to the base portion 44 of the airbag door retainer 42. Due thereto, the base portion 44 of the airbag door retainer 42 is fixed in a state of being nipped between the general portion 28A of the base member 28 of the glove box door outer 24 and the ribs 60 of the glove box door inner 26.

Further, as shown in FIG. 7 and FIG. 8, an airbag module 62 is installed in the central opening portion 58 of the glove box door inner 26. The airbag module 62 has a module case 64 made of metal. The module case 64 forms a box shape whose floor is shallow. An inflator fixing portion 66, that swells-out from the vehicle front side toward the vehicle rear side by being knocked-out in an isosceles trapezoid shape, is provided at the central lower portion of a floor wall portion 64A of the module case 64. The longitudinal sectional shape of the inflator fixing portion 66 is mountain shaped. A pair of left and right bolt insert-through holes 68 are formed in an inclined portion 66A at the vehicle upper side at the inflator fixing portion 66. Due to a pair of stud bolts 72 (see FIG. 8), that project-out from the axial direction intermediate portion toward the radial direction outer side of an inflator 70 that serves as a gas generating means, being inserted-in these bolt insert-through holes 68 and nuts 74 being screwed-together from the reverse surface side, the inflator 70 is fastened and fixed to the inclined portion 66A of the inflator fixing portion 66.

Further, mounting pieces 78, that are L-shaped and in whose central portions are formed screw insert-through holes 76, are respectively mounted to a total of four places at the both side portions of the module case 64. In correspondence therewith, screw insert-through holes 80 are formed on the same axes as the screw insert-through holes 76, at the both sides of central opening portion 58 of the glove box door inner 26. Then, by making the bolt insert-through holes 76 of the respective mounting pieces 78 correspond to the screw insert-through holes 80 of the glove box door inner 26 side, and by fastening and fixing by unillustrated fasteners such as screws or the like, the module case 64 is fixed to the central opening portion 58 of the glove box door inner 26 from the vehicle front side.

Further, elongated anchor hardware 82 are mounted to the top portion and the bottom portion of the module case 64. Anchor pieces 84, that are L-shaped in side view, are formed integrally with one side (the airbag door retainer 42 side) of the anchor hardware 82. The plural anchor pieces 84 are provided in correspondence with the above-described anchor holes 48 that are formed in the longitudinal wall portion 46 of the airbag door retainer 42. Then, by inserting the respective anchor pieces 84 into and anchoring them with the respective anchor holes 48, the airbag door retainer 42 is mounted to the module case 64.

As shown in FIG. 8, the inflator 70 that serves as the gas generating means, and a knee airbag 86 that inflates due to gas jetted-out from the inflator 70, are assembled within the above-described module case 64. The inflator 70 is formed in a solid cylindrical shape of an outer diameter that can be contained in the module case 64. Further, a gas jet-out portion 88 is formed on the same axis, at one end portion in the axial direction of the inflator 70. Moreover, the outer diameter of the gas jet-out portion 88 is shorter than the outer diameter of the inflator 70, and plural gas jet-out holes (not illustrated) are formed in the peripheral wall portion of the gas jet-out portion 88.

On the other hand, the knee airbag 86 is accommodated within the module case 64 in a folded-up state. More concretely, the knee airbag 86 is folded-up to a size that can be accommodated in the module case 64 due to the upper portion and the lower portion of the knee airbag 86 that is in a planar expanded state respectively being folded in the form of bellows and being set toward the central portion. Then, the above-described inflator 70 is inserted in the central portion (the heightwise direction intermediate portion) of the knee airbag 86, and the stud bolts 72 that project-out from the inflator 70 are passed-through the knee airbag 86, and are fixed to the inflator fixing portion 66 of the module case 64 in the above-described procedure. Accordingly, the knee airbag 86 is assembled in a state of being nipped between the inflator 70 and the inflator fixing portion 66. Further, in the state in which the glove box door built-in-type knee airbag device 40 is assembled in the vehicle, the inflator 70 of the knee airbag 86 is a gas flow-in portion 87 (see FIG. 6B).

Further, the central opening portion 58 of the glove box door inner 26 is, after assembly of the airbag module 62, closed by a reverse surface cover 92 that is made of resin and formed in a rectangular plate shape. Plural leg portions 94 are formed integrally from the four sides of the reverse surface cover 92 toward the glove box door inner 26 side. A claw is formed at the distal end portion of each of the leg portions 94. In correspondence therewith, plural rectangular insert holes 96 are formed at the outer peripheral portion of the central opening portion 58 at the floor wall portion 26A of the glove box door inner 26. Then, by inserting the leg portions 94 into the insert holes 96 and elastically engaging them, the reverse surface cover 92 is mounted to the surface at the vehicle front side of the glove box door inner 26.

The structure of the airbag doors relating to main portions of the present embodiment is described next.

Figure 1:
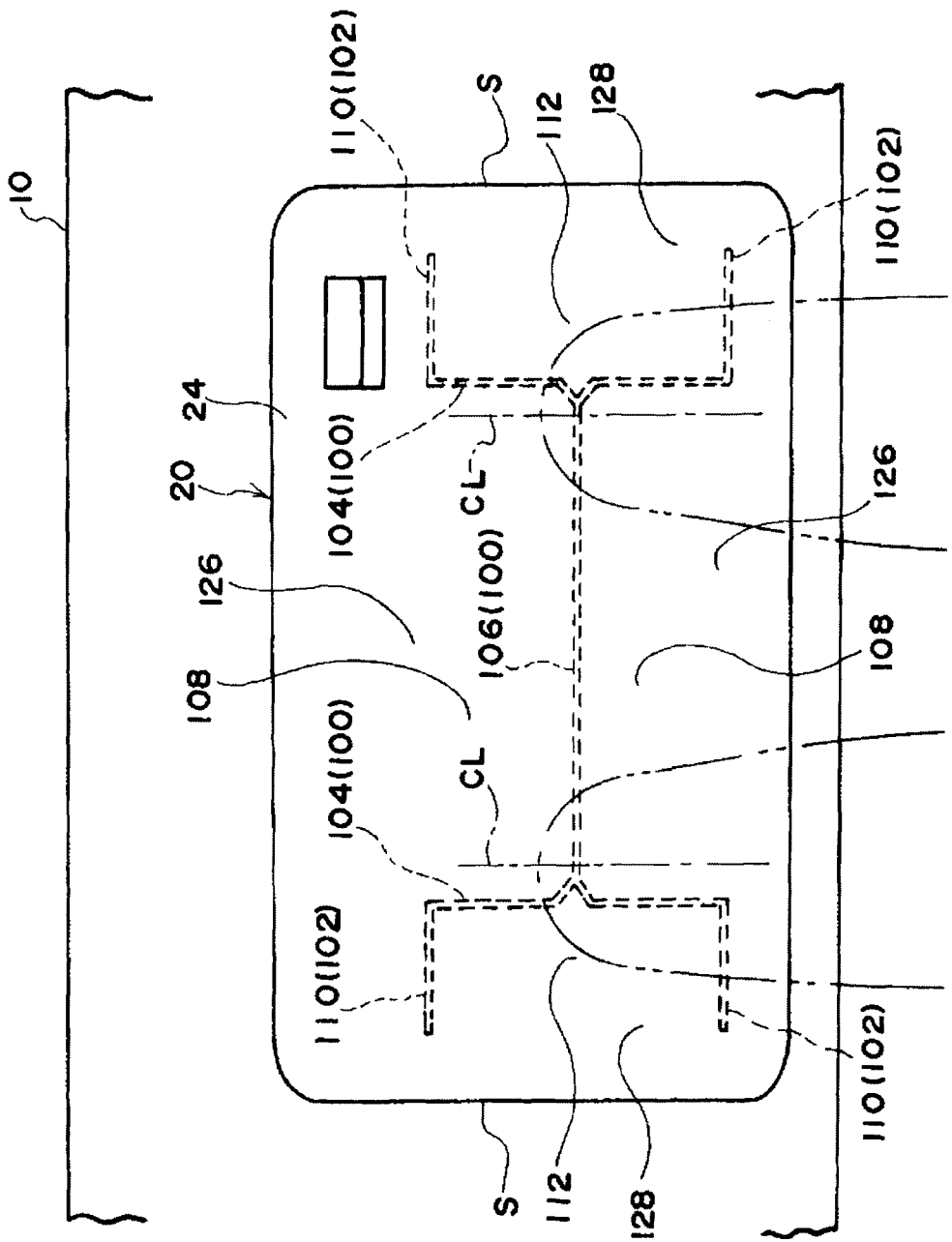
FIG. 1 is a schematic enlarged front view that relates to a glove box door built-in-type knee airbag device relating to a first embodiment, and that illustrates the shapes of tear portions of a glove box door in relation to the knees of a seated vehicle occupant.

As shown in FIG. 1, a first tear portion 100, that is formed in a substantial H shape in front view, and second tear portions 102, that are formed so as to be continuous with both sides of the first tear portion 100, are formed at the reverse surface (the surface at the vehicle front side) of the glove box door outer 24 at the above-described glove box door 20. Note that, as can be understood from FIG. 8, the glove box door 20 of the present embodiment employs, from the standpoint of design, an invisible type tear structure in which the first tear portion 100 and the second tear portions 102 cannot be visually perceived from the vehicle cabin inner side. Therefore, to be exact, the first tear portion 100 and the second tear portions 102 cannot be seen when the glove box door 20 is viewed from the front surface, and, when the glove box door outer 24 is viewed from the reverse surface side, the first tear portion 100 and the second tear portions 102 can be seen.

The first tear portion 100 is formed in a substantial H shape that includes a pair of left and right vertical direction tear portions 104, and a first lateral direction tear portion 106 that connects, in the vehicle transverse direction, vertical direction intermediate portions of these vertical direction tear portions 104. Note that the connected portions of the vertical direction tear portions 104 and the first lateral direction tear portion 106 are sideways Y shapes. Due to the first tear portion 100 being set, when bag inflation pressure of greater than or equal to a predetermined value is applied to the glove box door outer 24 via the airbag door retainer 42, a pair of top and bottom first airbag doors 108 expand in a double-swing manner in the vehicle vertical direction around first door hinges 126 that are described below.

Further, the second tear portions 102 are respectively structured by a pair of top and bottom second lateral direction tear portions 110 that extend in parallel from the both end portions of the respective vertical direction tear portions 104 toward the sides opposite the first lateral direction tear portion 106. Due to the second tear portions 102 being set, when bag inflation pressure of greater than or equal to a predetermined value is applied to the glove box door outer 24 via the airbag door retainer 42, a pair of left and right second airbag doors 112 expand in a double-swing manner in the vehicle transverse direction around second door hinges 128 that are described below.

As partially shown in FIG. 7 and FIG. 8, first groove portions 116 and second groove portions (not illustrated) are formed in the central portion of the base portion 44 of the airbag door retainer 42 (the portion surrounded by the vertical wall portion 46), so as to correspond to the first tear portion 100 and the second tear portions 102 formed in the above-described glove box door outer 24, in similar shapes and so as to overlap these. The first groove portions 116 are structured by a first lateral direction groove portion 120 and a pair of left and right first vertical direction groove portions 122, and the second groove portions are structured by a total of four second lateral direction groove portions 124 that respectively extend from the vertical direction both end portions of the respective first vertical direction groove portions 122 in directions of moving away from one another.

Further, as shown in FIG. 8, the first door hinges 126 and the second door hinges 128 (not shown in FIG. 8, see FIG. 1) are formed at the inner peripheral side of the vertical wall portion 46 at the base portion 44 of the airbag door retainer 42. The first door hinges 126 are provided at positions that connect the distal end portions of the pair of left and right vertical direction tear portions 104 of the glove box door outer 24, and the cross-sectional shape thereof is substantially V-shaped. When the first airbag doors 108 expand upward and downward, the first door hinges 126 are expanded while being stretched. Note that the second door hinges 128 also are structured similarly.

Further, as shown in FIG. 1, the vertical direction tear portions 104 are set at vehicle transverse direction outer sides of knee central lines CL of the seated vehicle occupant and at vehicle transverse direction inner sides of vertical direction outer shape lines S of the glove box door 20.

Portions other than the above-described airbag door structure are supplementarily described below. A state in which the glove box door built-in-type knee airbag device 40 has operated is shown in a side view in FIG. 6B. The X line view portion (portion indicated by line X) in FIG. 6B is the "upper shin portion" of the vehicle occupant. The upper shin portion X is the region about directly beneath a kneecap (knee joint) Y.

(Operation and Effects of Present Embodiment)

The operation and effects of the present embodiment are described next.

When the vehicle, in which the glove box door built-in-type knee airbag device 40 of the above-described structure is installed, front-collides, the state thereof is sensed by an unillustrated collision sensing means, and a sensing signal is outputted to an airbag ECU. When airbag operation is decided upon by the airbag ECU, various types of airbag devices at the driver's seat side operate, and in addition, the glove box door built-in-type knee airbag device 40 at the front passenger's seat side also operates. Namely, predetermined current is sent to the squib of the inflator 70 of the airbag module 62 that is built in the glove box door 20, and the inflator 70 is operated. Due thereto, gas is generated from the inflator 70, this gas is supplied into the knee airbag 86 that is housed within the glove box door 20 in a folded-up state, and this is inflated.

When the knee airbag 86 in the folded-up state inflates and the bag inflation pressure that is applied to the first tear portion 100 and the second tear portions 102 via the airbag door retainer 42 reaches a predetermined value, the first tear portion 100 and the second tear portions 102 fracture (rupture), and the first airbag doors 108 expand in a double-swing manner in the vehicle vertical direction around the first door hinges 126, and the second airbag doors 112 expand in a double-swing manner in the vehicle transverse direction around the second door hinges 128. Due thereto, the knee airbag 86 is inflated and expanded in the gap between the knees of the vehicle occupant and the glove box door 20 (the instrument panel 10). As a result, the knees of the vehicle occupant are restrained and protected by the knee airbag 86.

Here, in the present embodiment, the knee airbag 86 is disposed at the height of the knees of the vehicle occupant who is in a seated state. Therefore, if the vehicle occupant is seated in the front passenger's seat in a state in which his/her knees are close or the like to the glove box door 20, as shown in FIG. 6, at the time of inflation and expansion of the knee airbag 86, there are cases in which the shin upper portions X are strongly pushed toward the vehicle rear side by the expansion reaction force of the knee airbag 86. To describe in more detail, the glove box 14 is fixed to the instrument panel 10, and the knee airbag 86 is pushed upward and downward by the first airbag doors 108 and the flow of gas in the left and right directions therein also is pushed by the knees Y of the vehicle occupant that are close to the first airbag doors 108. Therefore, there is no escape route for the expansion reaction force of the knee airbag 86, and all of the expansion reaction force is transmitted to the upper shin portions X of the vehicle occupant.

However, in the present embodiment, the second tear portions 102 are formed at the glove box door outer 24 in addition to the first tear portion 100, and the second airbag doors 112 that expand in the vehicle transverse direction are provided in addition to the first airbag doors 108 that expand in the vehicle vertical direction. Therefore, if the knees of the seated vehicle occupant are close or the like to the first airbag doors 108, the second tear portions 102 fracture (rupture), and the second airbag doors 112 are greatly expanded in the vehicle transverse direction before the first airbag doors 108.

Figure 2:
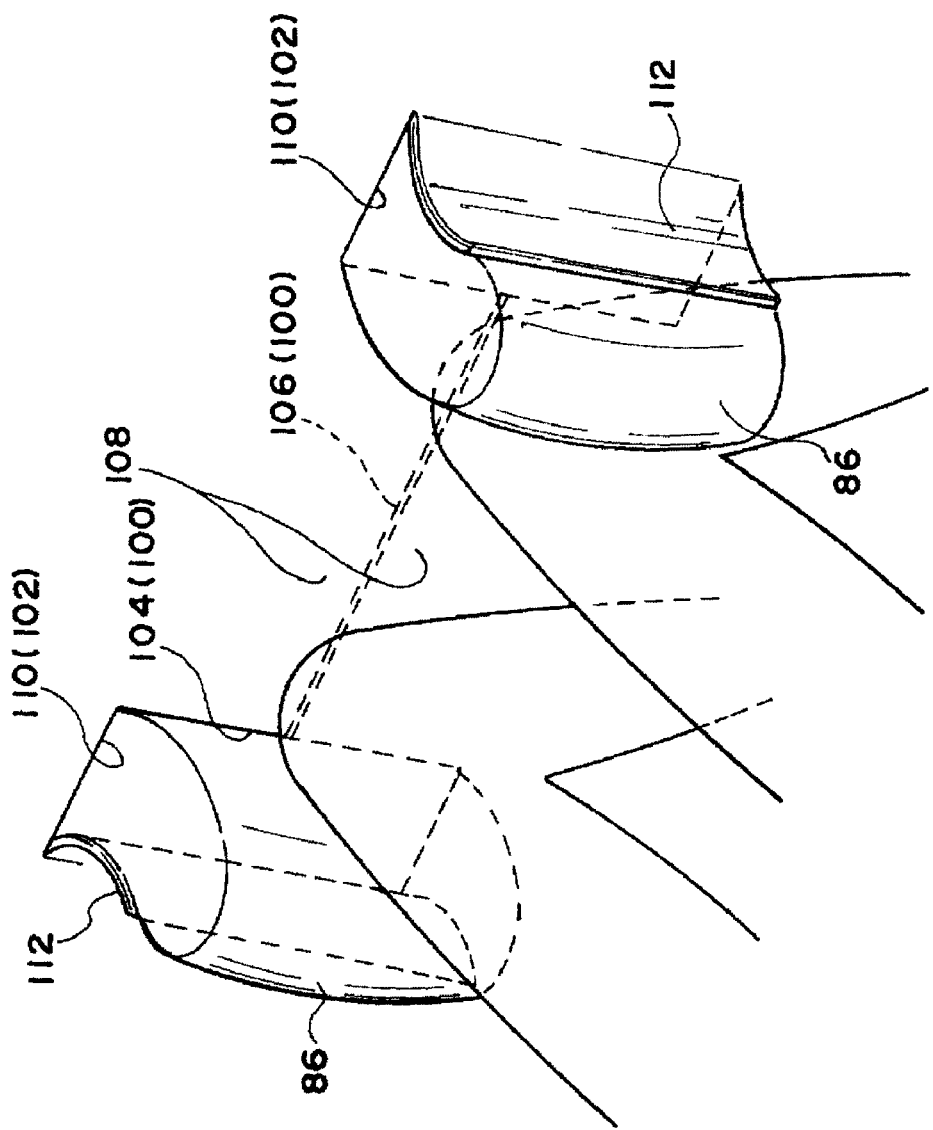
FIG. 2 is a perspective view showing a process (initial stage of expansion) in which the glove box door built-in-type knee airbag device shown in FIG. 1 operates and a knee airbag inflates and expands.
Figure 3:
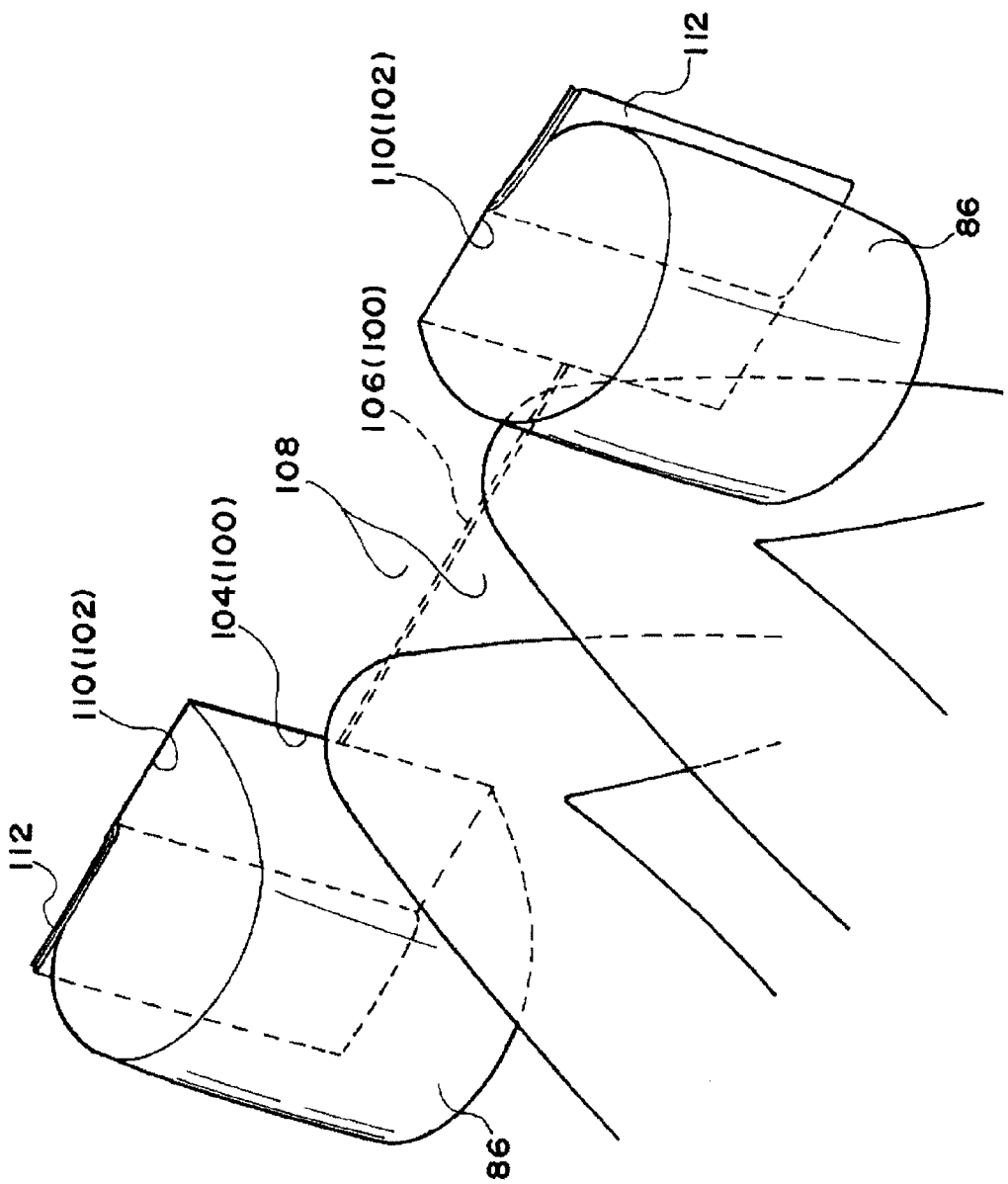
FIG. 3 is a similar perspective view showing a process (initial stage of expansion) in which the glove box door built-in-type knee airbag device shown in FIG. 1 operates and the knee airbag inflates and expands.
Figure 4:
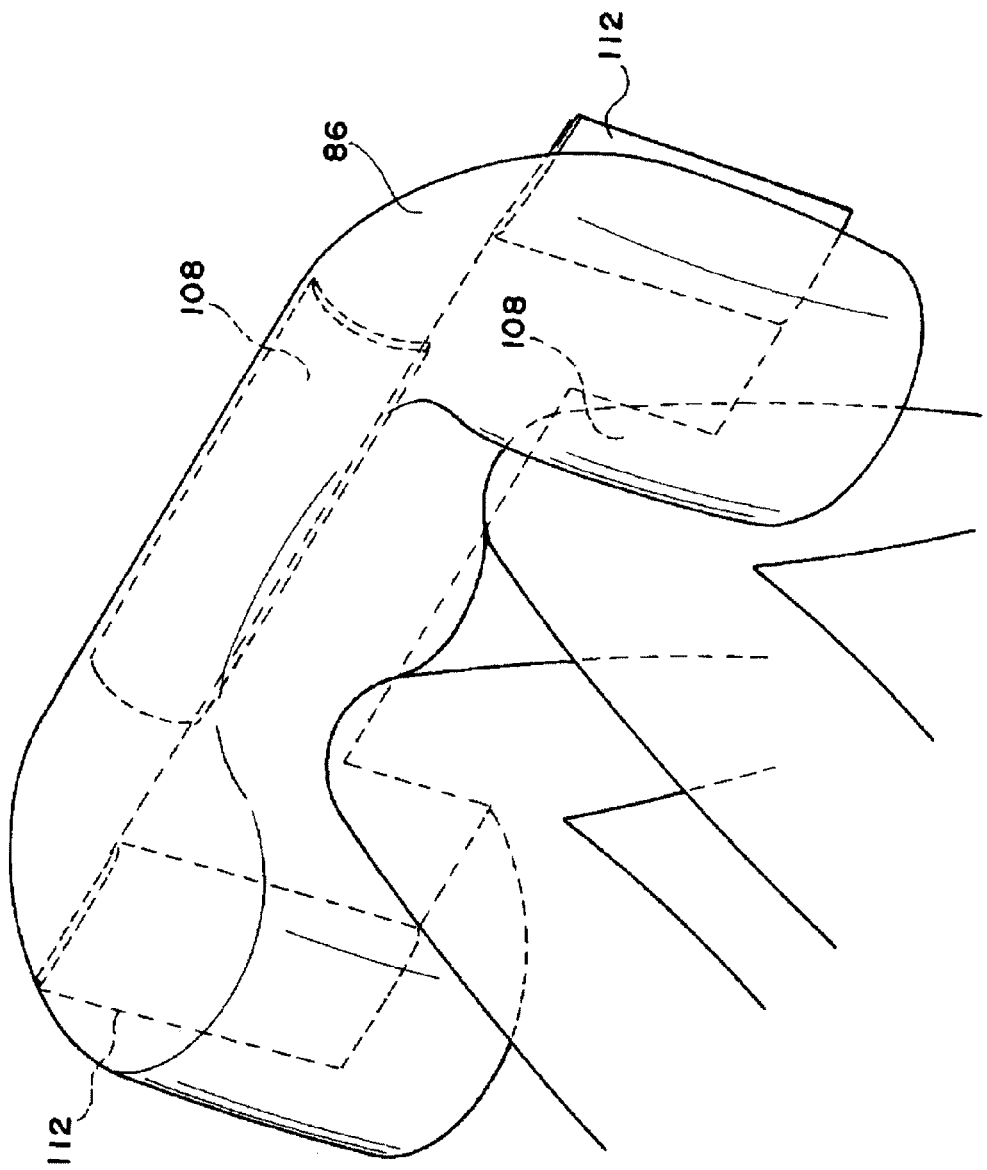
FIG. 4 is a similar perspective view showing a process (intermediate stage of expansion) in which the glove box door built-in-type knee airbag device shown in FIG. 1 operates and the knee airbag inflates and expands.

To describe concretely by using FIG. 2 through FIG. 5, first, as shown in FIG. 2, the second tear portions 102 fracture (rupture), and the second airbag doors 112 start to expand in the vehicle transverse direction. Accompanying this, the knee airbag 86 starts to inflate and expand in the vehicle transverse direction. Further, as shown in FIG. 3, the second airbag doors 112 greatly expand in the vehicle transverse direction, and, accompanying this, the knee airbag 86 further proceeds to inflate and expand in the vehicle transverse direction. Next, as shown in FIG. 4, the first lateral direction tear portion 106 of the first tear portion 100 fractures (ruptures), and the first airbag door 108 at the upper side is expanded greatly toward the vehicle upper side. Due thereto, the upper portion side of the knee airbag 86 is inflated and expanded. Thereafter, as shown in FIG. 5, the first airbag door 108 at the lower side is inflated and expanded toward the vehicle lower side, and the knee airbag 86 is completely inflated and expanded.

In this way, in the present embodiment, in the initial stage of the inflation and expansion process, the both side portions of the knee airbag 86 are greatly inflated and expanded toward the vehicle transverse direction both sides, and, due thereto, the expansion reaction force of the knee airbag 86 that is applied to the upper shin portions X of the vehicle occupant can be effectively suppressed. As a result, in accordance with the present embodiment, the load on the shins (the upper shin portions X) when the knee airbag 86 inflates and expands in a state in which the knees Y of the vehicle occupant are close or the like to the glove box door 20, can be reduced.

Further, in accordance with the present embodiment, by changing the length of the second lateral direction tear portions 110, the size of the second airbag doors 112 that expand in the vehicle transverse direction can be changed easily. Accordingly, the size of the second airbag doors 112 that expand in the vehicle transverse direction can be adjusted simply, and accordingly, the pushing force that pushes the upper shin portions X of the seated vehicle occupant toward the vehicle rear side can be controlled.

Moreover, in the present embodiment, the vertical direction tear portions 104 are set at the vehicle transverse direction outer sides of the knee central lines CL of the seated vehicle occupant and at the vehicle transverse direction inner sides of the vertical direction outer shape lines S of the glove box door 20. Therefore, providing the second tear portions 102 and expanding the second airbag doors 112 in the vehicle transverse direction is extremely effective. In other words, from the standpoint of restrictions on the design on the glove box door 20, even if the interval between the knee central line CL of the seated vehicle occupant and the vertical direction outer shape line S of the glove box door 20 is narrow, the second airbag doors 112 are expanded, and the load on the upper shin portions X of the vehicle occupant can be reduced.

Further, in the present embodiment, because the knee airbag 86 is accommodated in the glove box door 20, the knee airbag 86 is inflated and expanded from the glove box door 20. Therefore, there is no need to ensure, within the instrument panel 10, a space exclusively used for accommodating the knee airbag 86 in the folded-up state. Accordingly, in accordance with the present embodiment, the conventional degrees of freedom in design of the glove box door 20, and accordingly the instrument panel 10, can be ensured.

Second Embodiment

A second embodiment of a knee airbag device for a vehicle relating to the present invention is described hereinafter by using FIG. 10 through FIG. 12. Note that structural portions that are the same as the above-described embodiment are denoted by the same numbers, and description thereof is omitted.

In this second embodiment, the object is to show variations of the tear shapes of the first tear portion 100 and the second tear portions 102 that were described in the above-described first embodiment.

In the embodiment shown in FIG. 10, the planar shape of the design surface of the instrument panel 10 forms a curved shape that extends toward the vehicle rear side from the vehicle transverse direction outer side toward the vehicle transverse direction central side. Note that the embodiment shown in this drawing is a left hand drive vehicle.

In the same way as in the above-described first embodiment, the glove box door 20 is disposed at the front passenger's seat side of the instrument panel 10 in which the above-described design is employed, and the glove box door built-in-type knee airbag device 40 is built within the glove box door 20.

Here, as shown in FIG. 11, in this embodiment, the second tear portions are asymmetrical shapes at the left and the right. Concretely, the second tear portion 110 at the central side of the instrument panel 10 is set to be longer than a second tear portion 130 at the vehicle transverse direction outer side (an unillustrated side door side).

[Operation/Effects]

In accordance with the above-described structure as well, operation/effects that are similar to those of the above-described first embodiment are obtained.

Figure 10A:
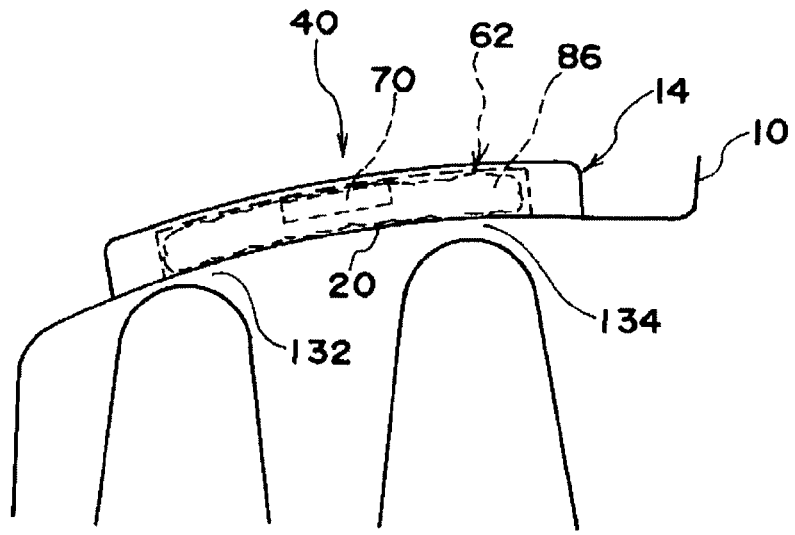
FIG. 10A is a schematic plan view that relates to a glove box door built-in-type knee airbag device relating to a second embodiment, and that illustrates a state before operation.
Figure 10B:
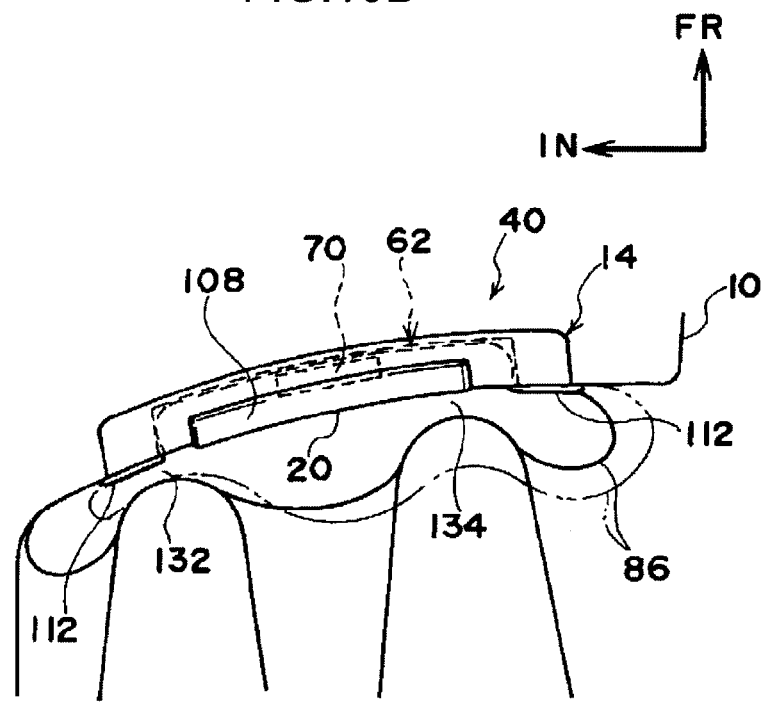
FIG. 10B is a schematic plan view that relates to the glove box door built-in-type knee airbag device relating to the second embodiment, and that illustrates a state after operation.

In addition, in the present embodiment, the planar shape of the design surface side of the instrument panel 10 forms a curved shape that extends toward the vehicle rear side from the vehicle transverse direction outer side toward the vehicle transverse direction central side. Therefore, as shown in FIG. 10A, at the instrument panel central side, a gap 132 between the knee of the vehicle occupant and the instrument panel 10 is more narrow than a gap 134 at the vehicle transverse direction outer side. Therefore, if the second tear portions 110, that have symmetrical shapes at the left and the right and at which the tear structure of the present embodiment is not employed, are employed, as shown by the two-dot chain line in FIG. 10B, the knee airbag 86 proceeds to inflate and expand toward the vehicle transverse direction outer side (the wide space 134).

However, by forming, in advance, the second tear portion 110 at the instrument panel central side to be longer in the vehicle transverse direction than the second tear portion 130 at the vehicle transverse direction outer side as in the present embodiment, the knee airbag 86 attempts to expand greatly toward the instrument panel central side, and the knee airbag 86, that attempts to inflate and expand toward the vehicle transverse direction outer side, is pulled-back toward the instrument panel central side. As a result, as shown by the solid line in FIG. 10B, the knee airbag 86 is inflated and expanded approximately uniformly at the left and right both knees. Accordingly, even if the gap 132 is narrow, the second airbag doors 112 are expanded greatly and the knee airbag 86 can be inflated and expanded greatly, and accordingly, the load on the shins of the vehicle occupant can be reduced.

Figure 12A:
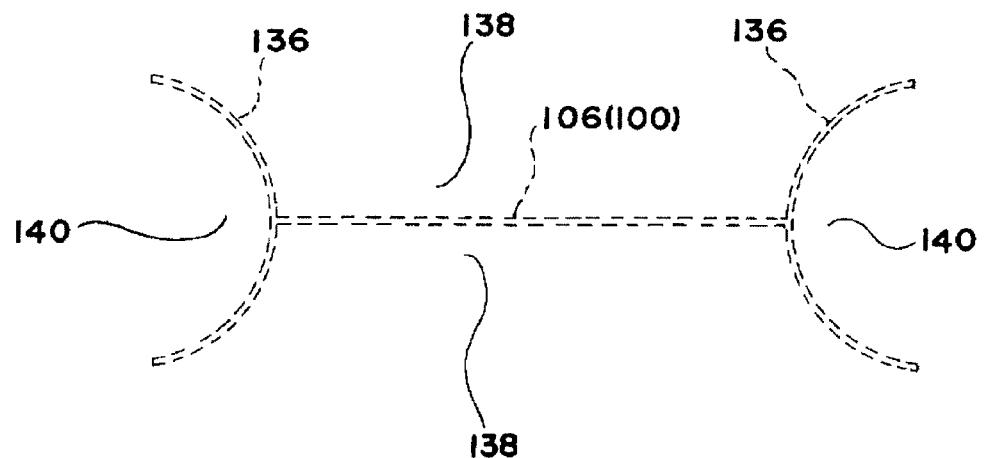
FIG. 12A is an enlarged front view showing a first modified example of tear portion shapes.

In an embodiment shown in FIG. 12A, arc-shaped tear portions 136 that are formed in substantially semicircular shapes are formed instead of the vertical direction tear portions 104 and the second lateral direction tear portions 110 of the embodiment shown in FIG. 10. Due thereto, a pair of top and bottom first airbag doors 138 that are substantially isosceles trapezoid shaped, and a pair of left and right second airbag doors 140 that are substantially semicircular are formed. In addition, in the case of this embodiment, the arc-shaped tear portions 136 perform the functions of both the vertical direction tear portions 104 and the second lateral direction tear portions 110.

Figure 12B:
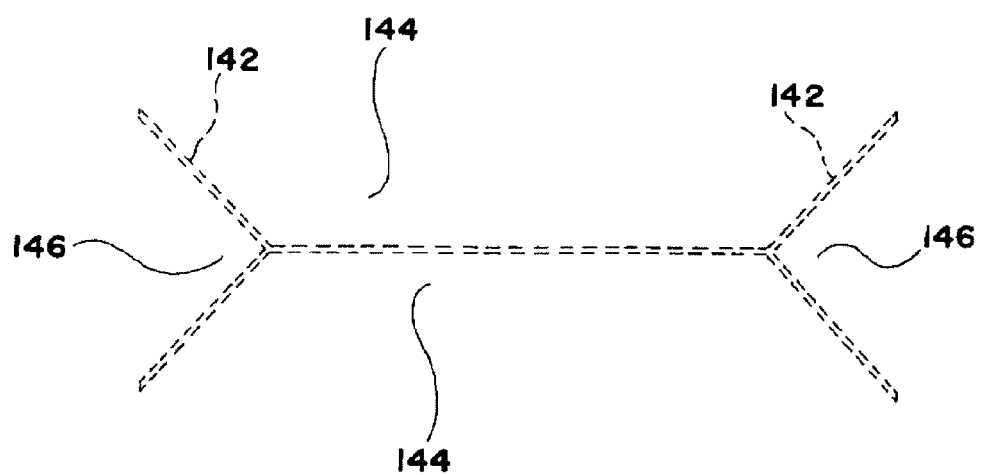
FIG. 12B is an enlarged front view showing a second modified example of tear portion shapes.

In an embodiment shown in FIG. 12B, V-shaped tear portions 142 are used instead of the arc-shaped tear portions 136 of the embodiment shown in FIG. 12A. Due thereto, a pair of top and bottom first airbag doors 144 that are isosceles trapezoid shaped, and a pair of left and right second airbag doors 146 that are equilateral triangular are formed. In addition, in the case of this embodiment, the V-shaped tear portions 142 perform the functions of both the vertical direction tear portions 104 and the second lateral direction tear portions 110.

Third Embodiment

A third embodiment of a knee airbag device for a vehicle relating to the present invention is described hereinafter by using FIG. 13. Note that structural portions that are the same as the above-described embodiments are denoted by the same numbers, and description thereof is omitted.

Figure 13:
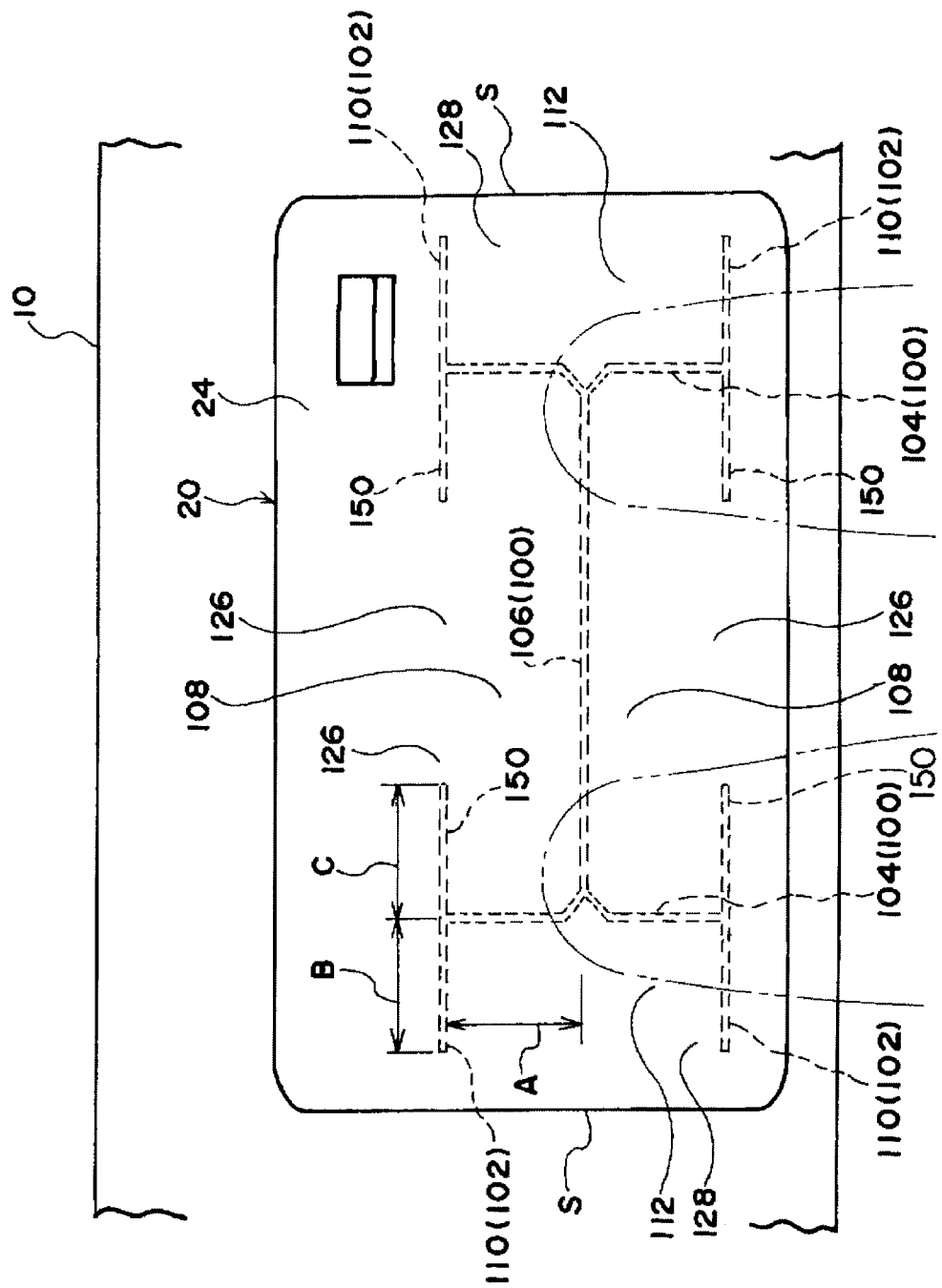
FIG. 13 is a schematic enlarged front view that relates to a glove box door built-in-type knee airbag device relating to a third embodiment, and that illustrates the shapes of tear portions of a glove box door in relation to the knees of a seated vehicle occupant.

As shown in FIG. 13, this third embodiment has the feature in the point that third lateral direction tear portions 150 are added to the first tear portion 100 of the above-described first embodiment.

To describe concretely, the third lateral direction tear portions 150 are respectively formed, in parallel to the first lateral direction tear portion 106, at the both end portions in the vertical direction of the vertical direction tear portions 104. The respective third lateral direction tear portions 150 are disposed on the same straight lines as the second lateral direction tear portions 110, and are continuous with the second lateral direction tear portions 110.

Further, when the distance between the first lateral direction tear portion 106 and the second lateral direction tear portion 110 is A, and the length of the second lateral direction tear portion 110 is B, and the length of the third lateral direction tear portion 150 is C, they are set to A≈B≈C.

(Operation/Effects)

In accordance with the above-described structure as well, operation/effects that are similar to those of the above-described first embodiment are obtained.

In addition, in the present embodiment, the third lateral direction tear portions 150 that are continuous with the second lateral direction tear portions 110 are added to the both end portions in the vertical direction of the vertical direction tear portions 104, and therefore, the following operation/effects are obtained. Namely, if only the second lateral direction tear portions 110 are formed and the third lateral direction tear portions 150 are not formed (the case of the above-described first embodiment), due to the first door hinges 126 existing adjacent to the second lateral direction tear portions 110, the portions that are the intersection points between the vertical direction tear portions 104 and the second lateral direction tear portions 110 cannot stretch, and there are cases in which it is difficult to fracture (rupture) the second lateral direction tear portions 110.

However, in the present embodiment, the third lateral direction tear portions 150, that extend toward the opposite sides of the second lateral direction tear portions 110, are added in continuation from the both end portions in the vertical direction of the vertical direction tear portions 104, and therefore, the portions that are the aforementioned intersection points can stretch. As a result, in accordance with the present embodiment, the second lateral direction tear portions 110 easily fracture (rupture), and the expandability of the second airbag doors 112 that expand in the vehicle transverse direction can be improved.

Further, in the present embodiment, when the distance between the first lateral direction tear portion 106 and the second lateral direction tear portion 110 is A, and the length of the second lateral direction tear portion 110 is B, and the length of the third lateral direction tear portion 150 is C, they are set to A≈B≈C. Therefore, the first lateral direction tear portion 106, the vertical direction tear portions 104, the second lateral direction tear portions 110, and the third lateral direction tear portions 150 proceed to fracture (rupture) in a balanced manner. As a result, in accordance with the present embodiment, the expandability of the first airbag doors 108, that expand in the vehicle vertical direction, and the expandability of the second airbag doors 112, that expand in the vehicle transverse direction, can be further improved.

Fourth Embodiment

A fourth embodiment of a knee airbag device for a vehicle relating to the present invention is described hereinafter by using FIG. 14 through FIG. 18. Note that structural portions that are the same as the above-described embodiments are denoted by the same numbers, and description thereof is omitted.

Figure 14:
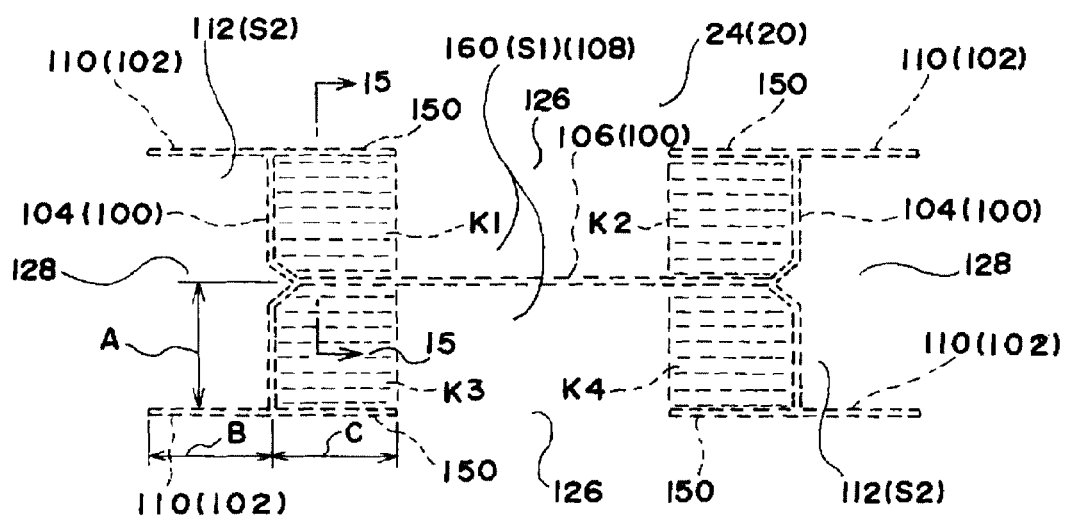
FIG. 14 is a front view that relates to a glove box door built-in-type knee airbag device relating to a fourth embodiment, and that extracts main portions from FIG. 13.
Figure 15:
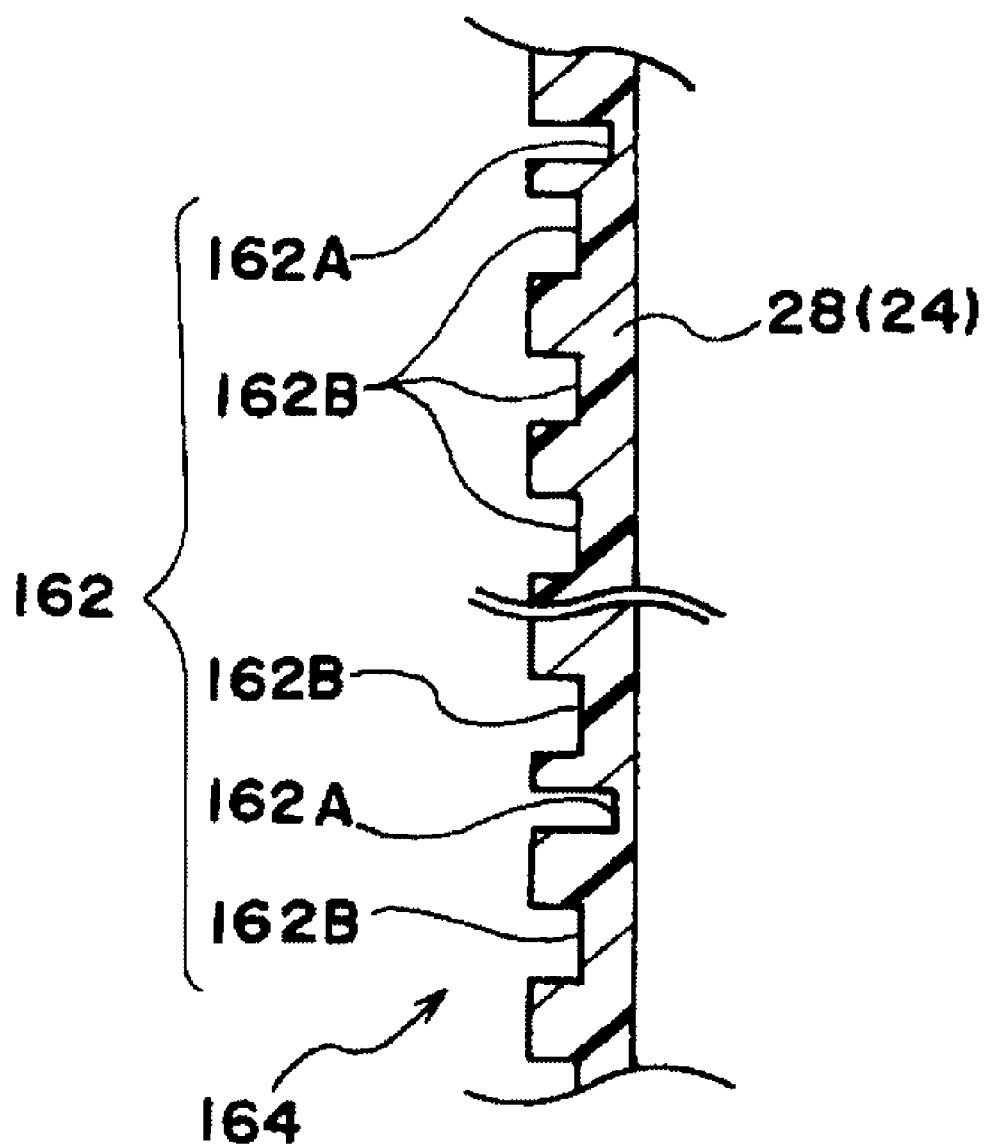
FIG. 15 is a line 15-15 enlarged sectional view of FIG. 14.

As shown in FIG. 14, this fourth embodiment has the feature in the point that the vehicle transverse direction both end portions of the first airbag doors 108 in the above-described third embodiment are weakened.

To describe concretely, the first tear portion 100, the second tear portions 102 and the third lateral direction tear portions 150 that were described in the above-described third embodiment are formed as is at the glove box door outer 24. Then, a total of four regions K1 through K4, that are positioned at the vehicle transverse direction outer sides of the first door hinges 126 at the first airbag doors 108, are weakened. Note that door main body portions 160, that are regions that include the first door hinges 126 at the first airbag doors 108, are not weakened.

The method of weakening is described next. As shown in an enlarged manner in FIG. 15, in the present embodiment, thin-walled portions 164 are formed at the reverse surface sides of the four regions K1 through K4 of the first airbag doors 108 by forming numerous grooves 162, whose groove longitudinal directions are the vehicle transverse direction, at a predetermined pitch. The numerous grooves 162 are structured by deep grooves 162A and shallow grooves 162B being combined, and bend easily in the arrayed direction of the grooves 162. Note that the thin-walled portions 164 of the regions K1 through K4 at which the numerous grooves 162 are formed may be called "weakened portions", "fragile portions" or "low rigidity portions", and, provided that there is a structure that can weaken, all can be applied. For example, the plate thicknesses of all of the regions of K1 through K4 may be set to a predetermined thickness that is thinner than the plate thickness of the door main body portion 160.

Further, in this fourth embodiment as well, the layout of the vertical direction tear portions 104, the second lateral direction tear portions 110, and the third lateral direction tear portions 150 is set such that the relationship A≈B≈C of the above-described third embodiment is established. Moreover, in this embodiment, a surface area S1 of the door main body portions 160 of the first airbag doors 108 and a surface area S2 of the second airbag doors 112 are set so as to be substantially the same.

Figure 16:
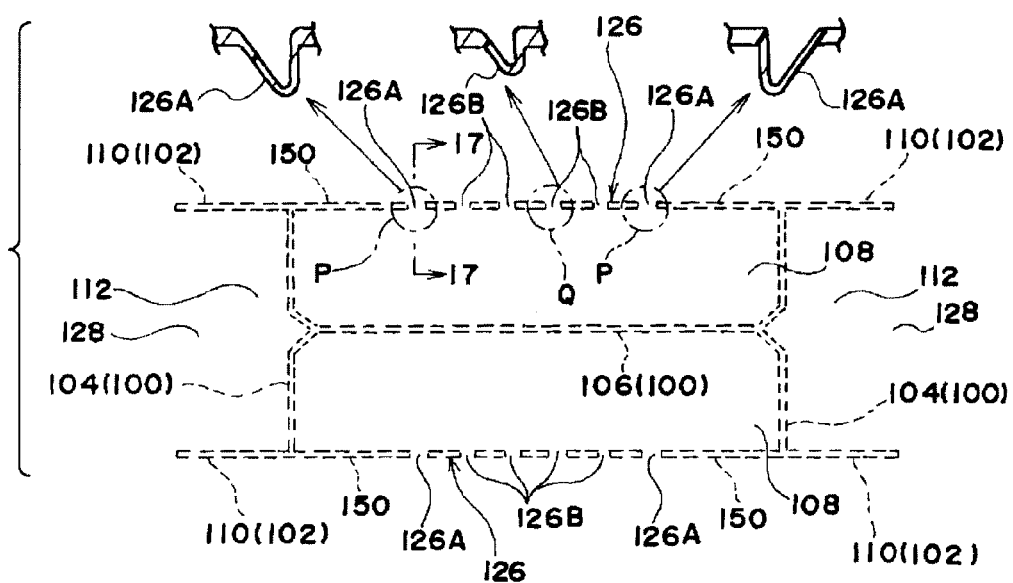
FIG. 16 is a front view, corresponding to FIG. 14, for explaining the structure of first door hinges.
Figure 17:
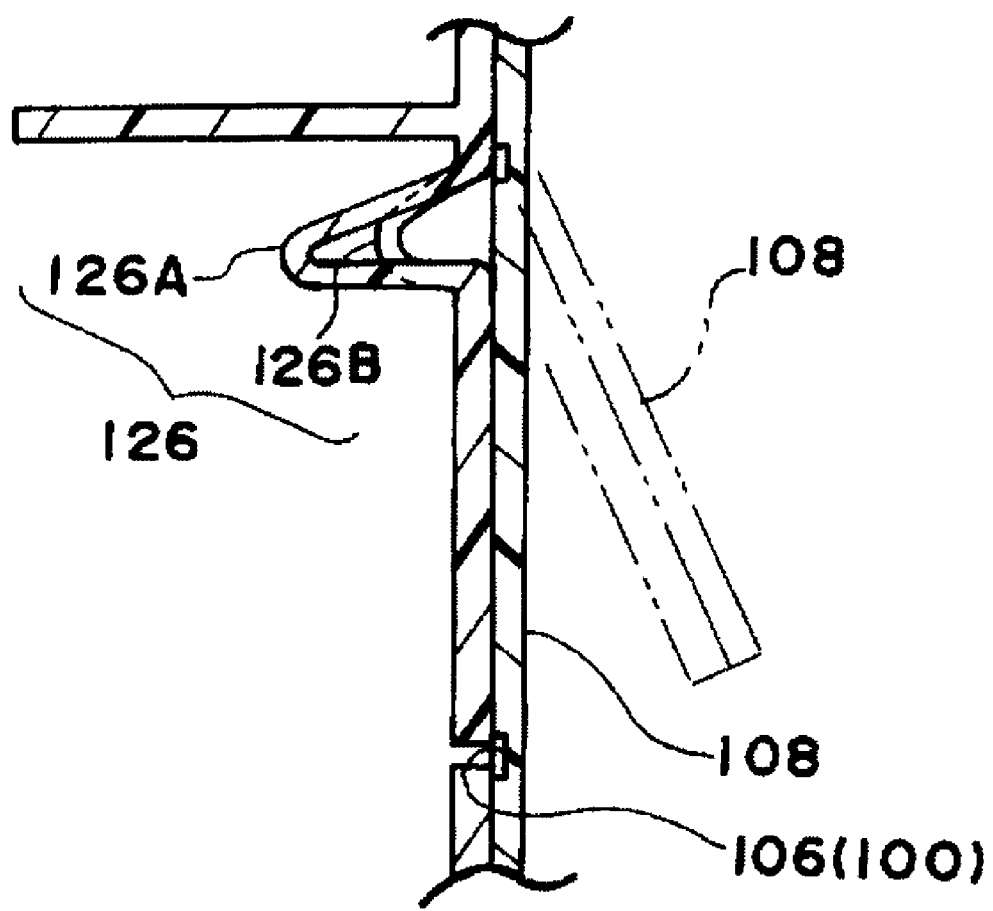
FIG. 17 is a line 17-17 sectional view of FIG. 16.

Moreover, as shown in FIG. 16 and FIG. 17, the hinge length of both end portions 126A (i.e., the regions adjacent to the distal end portions of the third lateral direction tear portions 150 (the P line view portions (portions indicated by line P) of FIG. 16)) of the first door hinge 126 are set to be longer than the hinge length of central sides 126B (the Q line view portion (portion indicated by line Q) of FIG. 13) of the first door hinge 126.

(Operation/Effects)

In accordance with the above-described structure as well, operation/effects that are similar to those of the above-described third embodiment are obtained.

In addition, in the present embodiment, because the dimensions of the respective portions are set such that the surface area S1 of the door main body portions 160 of the first airbag doors 108 and the surface area S2 of the second airbag doors 112 are substantially the same, the bag inflation pressure that the first airbag doors 108 and the second airbag doors 112 receive is substantially uniform. Therefore, the first airbag doors 108 and the second airbag doors 112 can be expanded substantially uniformly. As a result, in accordance with the present embodiment, the first airbag doors 108 and the second airbag doors 112 can be expanded rapidly and smoothly.

Figure 18A:
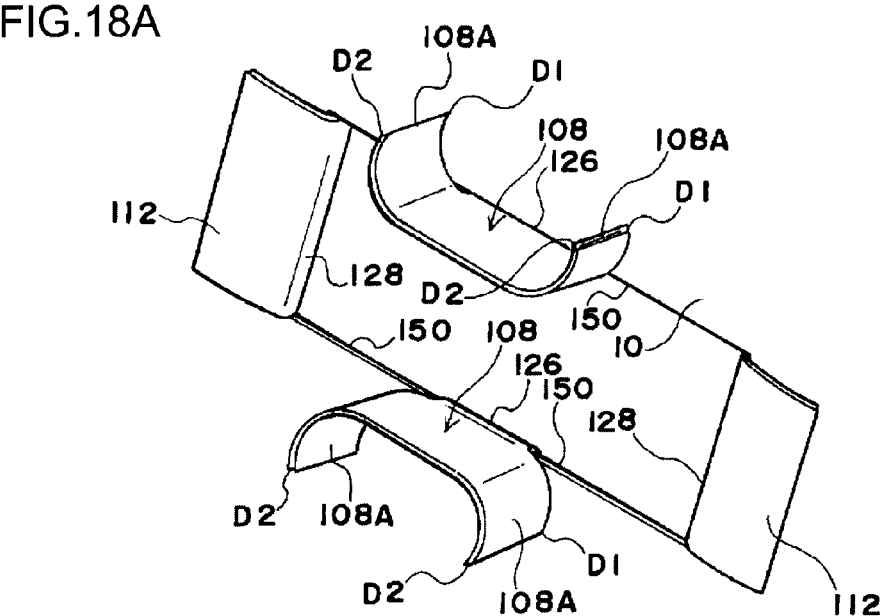
FIG. 18A is a perspective view of an expanded state of first airbag doors and second airbag doors, relating to an explanatory drawing for explaining the operation and effects of the fourth embodiment.
Figure 18B:
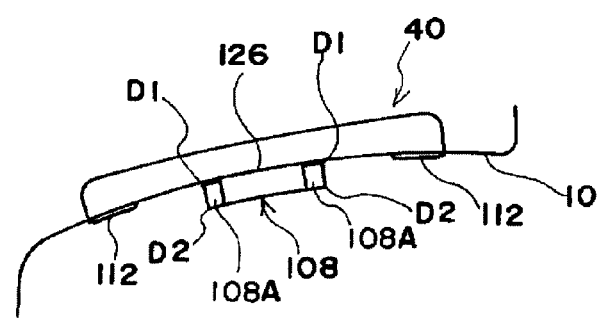
FIG. 18B is a plan view of the expanded state of the first airbag doors and the second airbag doors, relating to an explanatory drawing for explaining the operation and effects of the fourth embodiment.
Figure 18C:
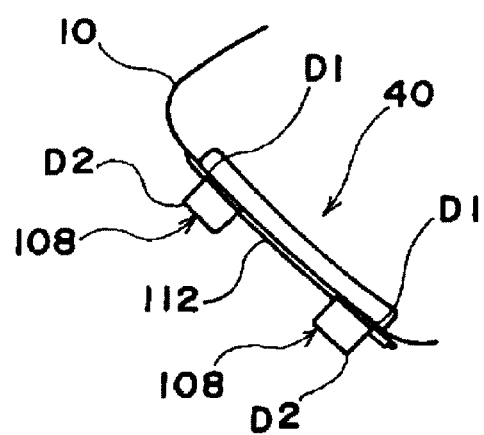
FIG. 18C is a side view of the expanded state of the first airbag doors and the second airbag doors, relating to an explanatory drawing for explaining the operation and effects of the fourth embodiment.

Further, as shown in FIG. 18A through FIG. 18C, by adding the third lateral direction tear portions 150, at the time of expanding of the first airbag doors 108, end portions 108A in the vehicle transverse direction of the first airbag doors 108 roll upward. This rolling-up impedes the expansion, in the vehicle vertical direction, of the first airbag doors 108.

However, in the present embodiment, all of the regions K1 through K4, that are formed at the outer sides of the first door hinges 126 that are adjacent to the third lateral direction tear portions 150 and are formed on extended lines thereof at the first airbag doors 108, are weakened as compared with the door main body portions 160 that are the regions other than these. Therefore, even if these regions K1 through K4 at the first airbag doors 108 interfere with the instrument panel 10, they are easily deformed. Accordingly, the expanding operation of the first airbag doors 108 is not obstructed. As a result, in accordance with the present embodiment, the first airbag doors 108 can be reliably expanded in the vehicle vertical direction.

Moreover, at the regions K1 through K4 that are formed at the outer sides of the first door hinges 126, corner portions D1 at the intersection point sides of the third lateral direction tear portions 150 and the vertical direction tear portions 104, and corner portions D2 at the intersection point sides of the first lateral direction tear portion 106 and the vertical direction tear portions 104, are both weakened, and therefore, the following operation is obtained.

Namely, when the corner portions D1 at the intersection point sides of the third lateral direction tear portions 150 and the vertical direction tear portions 104 are weakened, interference with the instrument panel 10 is mitigated, and therefore, good expandability of the first airbag doors 108 can be ensured. On the other hand, when the corner portions D2 at the intersection point sides of the first lateral direction tear portion 106 and the vertical direction tear portions 104, are weakened, interference with the knee airbag 86 is mitigated, and therefore, the load that is transmitted from these corner portions D2 via the knee airbag 86 to the knees of the vehicle occupant becomes low. As a result, in accordance with the present embodiment, further improvement in the expandability of the first airbag doors 108 can be aimed for, and the load that is transmitted from the first airbag doors 108 via the knee airbag 86 to the knees of the vehicle occupant can be suppressed.

Further, in the present embodiment, a hinge length of the third lateral direction tear portion 150 sides of the first door hinges 126 that are formed adjacent to the third lateral direction tear portions 150 and on extended lines thereof at the first airbag doors 108, is set to be longer than the hinge length at the door hinge central side. Therefore, the third lateral direction tear portion 150 side, at which the hinge length is relatively long, can smoothly expand by that much. As a result, the expandability of the first airbag door 108 can be improved.

[Supplementary Explanation of the Above-Described Embodiments]

(1) In the above-described embodiments, explanation is given with the glove box door built-in-type knee airbag device 40 operating at the time of a front collision, but the present invention is not limited to the same, and may operate a glove box door built-in-type knee airbag device in a case in which a collision predicting means such as a pre-crash sensor or the like is installed in a vehicle and collision is predicted by the collision predicting means.

(2) To supplementarily explain the term "built-in" in the case of the glove box door built-in-type knee airbag device 40 relating to the above-described embodiments, there is no need for all of the main structural elements of the knee airbag device to be disposed at the interior of the glove box door 20, and if at least the knee airbag is disposed at the interior of the glove box door, it is included in "built-in". Accordingly, upon communicating the inflator and the knee airbag by a communicating means such as a hose or the like as described above, the inflator may be provided at the glove box main body 16 side, or may be provided at the instrument panel 10, or may be provided at a body such as an instrument panel reinforcement or the like, or may be provided at an equipment or device such as an air conditioning unit or the like.

(3) In the above-described embodiments, the airbag module 62 is accommodated within the glove box door 20, but the present invention is not limited to the same, and the airbag module may be accommodated in an airbag case that is provided at the front passenger's seat side of the instrument panel.

(4) In the above-described embodiment, the first tear portion 100 is formed in a substantial H-shape by the pair of left and right vertical direction tear portions 104 and the first lateral direction tear portion 106 that connects these vertical direction tear portions 104 in the vehicle transverse direction. However, the present invention is not limited to the same, and the first tear portion 100 may be formed in a substantial B-shape in which the end portions, that face in the vehicle transverse direction, of the pair of left and right vertical direction tear portions 104 are connected by lateral direction (fourth) tear portions that extend in the vehicle transverse direction. In this case as well, similar operation and effects are obtained if the first airbag doors 108 expand in a double-swing manner in the vehicle vertical direction with the first door hinges 126, that are disposed in parallel above and below, being the centers of the expansion.

(5) Both a case in which the knees of the seated vehicle occupant exist close to the airbag door (e.g., the case shown in FIG. 6A), and a case in which the knees of the seated vehicle occupant exist in a state of contacting the airbag door (a case in which the knees push the airbag door), are included in "when an obstruction exists on a locus of movement at an initial stage of expansion of the first airbag doors" of the first aspect of the present invention.

(6) In the above-described fourth embodiment, the entire ranges of the regions K1 through K4 at the first airbag doors 108 are weakened, but it does not necessarily have to be so, and the corner portions only of the respective regions K1 through K4 may be weakened.

The invention claimed is:

1. A knee airbag device for a vehicle comprising:
    gas generating means for generating gas by operating;
    a knee airbag that is housed in a folded-up state, and that is disposed at a height of knees of a vehicle occupant who is in a seated state, and that inflates and expands toward the knees of the vehicle occupant due to gas supplied from the gas generating means; and
    an airbag cover that covers the knee airbag in the folded-up state, and that is provided with a first tear portion that, when bag inflation pressure of a predetermined value or greater is applied, fractures, and expands first airbag doors in a vehicle vertical direction, and second tear portions that are formed continuously with the first tear portion and that, even when an obstruction exists on a locus of movement at an initial stage of expansion of the first airbag doors, expand second airbag doors in a vehicle transverse direction,
    wherein the first tear portion is formed in an H-shape that includes a pair of left and right vertical direction tear portions, and a first lateral direction tear portion that connects these vertical direction tear portions in the vehicle transverse direction,
    the second tear portion is structured so as to include second lateral direction tear portions that extend from both end portions of the respective vertical direction tear portions toward sides opposite the first lateral direction tear portion, and
    the first tear portion further includes third lateral direction tear portions that extend from the both end portions of the respective vertical direction tear portions in parallel to the first lateral direction tear portion and toward sides opposite the second lateral direction tear portions and on same straight lines thereof, wherein when a distance between the first lateral direction tear portion and the second lateral direction tear portion is A, and a length of the second lateral direction tear portion is B, and a length of the third lateral direction tear portion is C, they are set to A=B=C.

2. The knee airbag device for a vehicle of claim 1, wherein a surface area of portions other than regions that are formed at vehicle transverse direction outer sides of door hinges that are formed adjacent to the third lateral direction tear portions and on extended lines thereof at the first airbag doors, and a surface area of the second airbag doors, are set to be the same.

3. The knee airbag device for a vehicle of claim 1, wherein at least portions of regions, that are formed at vehicle transverse direction outer sides of door hinges that are formed adjacent to the third lateral direction tear portions and on extended lines thereof at the first airbag doors, are weakened as compared with other regions.

4. The knee airbag device for a vehicle of claim 3, wherein weakened portions are provided at least one of corner portions at intersection point sides of the third lateral direction tear portions and the vertical direction tear portions, and corner portions at intersection point sides of the first lateral direction tear portion and the vertical direction tear portions, at the regions that are formed at the vehicle transverse direction outer sides of the door hinges.

5. The knee airbag device for a vehicle of claim 3, wherein regions are weakened by forming numerous grooves, whose groove longitudinal direction is the vehicle transverse direction, at a predetermined pitch at a reverse surface side of regions formed at outer sides of the door hinges.

6. The knee airbag device for a vehicle of claim 1, wherein connected portions of the vertical direction tear portions and the first lateral direction tear portion are formed in sideways Y-shapes.

7. The knee airbag device for a vehicle of claim 1, wherein the knee airbag is housed in a glove box door that is provided at a front passenger's seat side of an instrument panel.

* * * * *